United States Patent
Oyama

(10) Patent No.: US 12,072,538 B2
(45) Date of Patent: Aug. 27, 2024

(54) OPTICAL CONNECTOR

(71) Applicant: Sony Group Corporation, Tokyo (JP)

(72) Inventor: Yusuke Oyama, Tokyo (JP)

(73) Assignee: Sony Group Corporation, Tokyo (JP)

( * ) Notice: Subject to any disclaimer, the term of this patent is extended or adjusted under 35 U.S.C. 154(b) by 424 days.

(21) Appl. No.: 17/419,394

(22) PCT Filed: Nov. 11, 2019

(86) PCT No.: PCT/JP2019/044095
§ 371 (c)(1),
(2) Date: Jun. 29, 2021

(87) PCT Pub. No.: WO2020/148979
PCT Pub. Date: Jul. 23, 2020

(65) Prior Publication Data
US 2022/0066103 A1 Mar. 3, 2022

(30) Foreign Application Priority Data
Jan. 18, 2019 (JP) .................. 2019-006986

(51) Int. Cl.
*G02B 6/38* (2006.01)
*G02B 6/32* (2006.01)
(Continued)

(52) U.S. Cl.
CPC .............. *G02B 6/383* (2013.01); *G02B 6/32* (2013.01); *G02B 6/34* (2013.01); *G02B 6/3825* (2013.01);
(Continued)

(58) Field of Classification Search
CPC .......... G02B 6/32; G02B 6/34; G02B 6/3825; G02B 6/383; G02B 6/4214
See application file for complete search history.

(56) References Cited

U.S. PATENT DOCUMENTS

| | | | |
|---|---|---|---|
| 5,835,654 A | 11/1998 | Bergmann | |
| 6,004,043 A | 12/1999 | Abendschein et al. | |

(Continued)

FOREIGN PATENT DOCUMENTS

| | | | |
|---|---|---|---|
| JP | 2011-053302 A | 3/2011 | |
| JP | 2013-064803 A | 4/2013 | |

(Continued)

OTHER PUBLICATIONS

International Search Report issued in International Patent Application No. PCT/JP2019/044095 on Jan. 7, 2020 and English translation of same. 5 pages.

(Continued)

*Primary Examiner* — Daniel Petkovsek
(74) *Attorney, Agent, or Firm* — K&L Gates LLP

(57) ABSTRACT

The present technology provides an optical connector of a collimated coupling system that is less affected by an external impact. Provided is an optical connector including a first optical path converting unit having one or more reflection planes, the first optical path converting unit configured to emit light in an opposite direction to light propagation. The first optical path converting unit may be configured to emit light toward a second optical path converting unit that is present when the optical connector is connected with another optical connector. The first optical path converting unit and the second optical path converting unit may be configured to form a Z-shaped optical path.

13 Claims, 17 Drawing Sheets

(51) Int. Cl.
*G02B 6/34* (2006.01)
*G02B 6/42* (2006.01)
*F21V 8/00* (2006.01)

(52) U.S. Cl.
CPC .......... *G02B 6/4214* (2013.01); *G02B 6/0016* (2013.01); *G02B 6/002* (2013.01); *G02B 6/3829* (2013.01); *G02B 6/3878* (2013.01); *G02B 6/4292* (2013.01)

(56) References Cited

U.S. PATENT DOCUMENTS

| | | | | |
|---|---|---|---|---|
| 10,222,563 B2* | 3/2019 | Haase | .................. | G02B 6/4204 |
| 10,466,433 B2* | 11/2019 | Epitaux | ................ | G02B 6/4214 |
| 11,133,870 B2* | 9/2021 | Sengupta | ............ | G02B 6/3845 |
| 2003/0068117 A1 | 4/2003 | Syms | | |
| 2013/0121635 A1 | 5/2013 | Thacker et al. | | |
| 2013/0156366 A1 | 6/2013 | Raj et al. | | |
| 2015/0219863 A1* | 8/2015 | Haase | .................. | G02B 6/3883 |
| | | | | 385/60 |
| 2017/0108430 A1 | 4/2017 | Wijbrans et al. | | |
| 2018/0128992 A1 | 5/2018 | Li et al. | | |

FOREIGN PATENT DOCUMENTS

| | | |
|---|---|---|
| JP | 2013-088616 A | 5/2013 |
| JP | 2015-530628 A | 10/2015 |
| JP | 2016-126073 A | 7/2016 |

OTHER PUBLICATIONS

Written Opinion issued in International Patent Application No. PCT/JP2019/044095 on Jan. 7, 2020. 6 pages.

* cited by examiner $$\frac{S_2}{S_1} = \frac{h_2}{h_1}$$

$$\min\_S = \frac{(a/2)}{\tan(A/2)}$$

A

B

OPTICAL CONNECTOR

TECHNICAL FIELD

The present technology relates to optical connectors.

BACKGROUND ART

In optical fiber communication systems, optical connectors are generally used in order to make a detachable connection between optical cables or between an optical cable and an electronic device. Signal light is emitted from a connection surface of an optical connector, and the wavelength of a generally used semiconductor laser light source is in the near infrared region.

Currently, generally used optical connectors adopt a so-called physical contact (PC) system in which optical fibers are butted against each other in an optical connector. However, there is a tendency for the core diameter to decrease as the transmission capacity of an optical fiber increases. In addition, due to advantages such as that the tolerance of, for example, misalignment between connectors may be larger as compared to the conventional optical connectors of the butt-joint type, it is examined to adopt optical connectors of a collimated coupling system.

For example, proposed in Patent Document 1 is an optical connector including: a holding member that holds an optical transmission line; a lens member that is arranged at a tip side of the optical transmission line and has a lens; a protrusion and recess structure provided between these members; and a moving member that moves the protrusion and recess structure between a first state, in which protrusions and recesses of the protrusion and recess structure are fitted, and a second state, in which gaps are formed between the protrusions and the recesses, in which an incident angle, with respect to planes of the protrusions, of light that has been emitted from the optical transmission line satisfies total reflection conditions. It is described in Patent Document 1 that this prevents laser hazards when the optical connector is not connected.

CITATION LIST

Patent Document

Patent Document 1: Japanese Patent Application Laid-Open No. 2013-64803

SUMMARY OF THE INVENTION

Problems to be Solved by the Invention

However, the present inventors consider that, although prevention of laser hazards when the optical connector is not connected has been examined in the optical connector of the collimated coupling system, examination on the influence of an external impact is insufficient.

Therefore, the main purpose of the present technology is to provide an optical connector of a collimated coupling system that is less affected by an external impact.

Solutions to Problems

The present technology provides an optical connector, including a first optical path converting unit having one or more reflection planes, the first optical path converting unit configured to emit light in an opposite direction of light propagation.

The first optical path converting unit may be configured to emit light toward a second optical path converting unit that is present when the optical connector is connected with another optical connector.

The first optical path converting unit and the second optical path converting unit may be configured to form a Z-shaped optical path.

The optical connector may further include a housing, and a support that supports the first optical path converting unit and a light shield may be included in the housing.

The first optical path converting unit may be an optical path conversion block including a transparent member, and the optical path conversion block may have a reflection plane and an emission plane that emit light in the opposite direction of the light propagation.

The first optical path converting unit may have a protrusion protruding with respect to the emission plane on an emission end side and in a lateral direction of the first optical path converting unit.

The first optical path converting unit may be provided inside a support and have at least one or more reflection planes that reflect light in the opposite direction of the light propagation inside the support.

The support may support an optical fiber or a collimating lens connected with the optical fiber.

The first optical path converting unit may include a collimated light forming mechanism on an optical path.

A partition unit that partitions the first optical path converting unit from the outside may be further included in the lateral direction on an emission end side of the first optical path converting unit.

The first optical path converting unit may further include a protection unit on an emission end side thereof.

The optical connector may include a plurality of the first optical path converting units, and the plurality of first optical path converting units may be arranged so as to be symmetrical with respect to the light propagation.

An emission plane of the first optical path converting unit may be inclined so as not to be perpendicular to an optical path from the reflection plane.

The optical connector may further include an optical axis tolerance adjusting mechanism.

The optical axis tolerance adjusting mechanism may include an optical path extension mechanism having a plurality of reflection planes, and the optical path extension mechanism may be disposed preceding to a point where light arrives at an emission plane of the first optical path converting unit.

MODE FOR CARRYING OUT THE INVENTION

Figure 1:
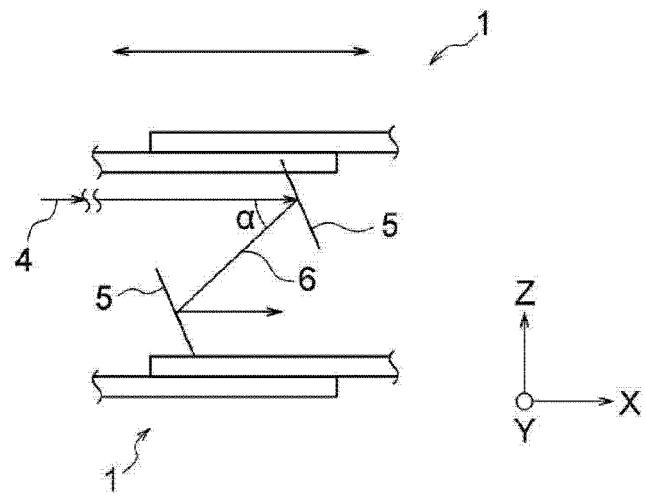
FIG. 1 is a conceptual diagram of an optical connector 1 of the present technology and the optical connectors 1 and 1 when connected.

Hereinafter, suitable embodiments for carrying out the present technology will be described by referring to the drawings.

The embodiments described below illustrate examples of typical embodiments of the present technology, and the scope of the present technology is not interpreted in a limiting manner due to these embodiments. Note that explanation will be given in the order below. Note that, in the drawings, the same or equivalent elements or members are designated by the same symbol, and redundant description will be omitted as appropriate.

1. Optical connector 1 of present technology
1 (1) Outline of optical connector of present technology
1 (2) Optical connector 1 of present technology
1 (3) Optical connector 1 of first embodiment of present technology
1 (3) -2 Example of manufacturing method of optical connector of first embodiment
1 (4) Optical connector 1 of second embodiment of present technology
1 (4) -2 Example of manufacturing method of optical connector of second embodiment
1 (5) Optical connector 1 of third embodiment of present technology
1 (6) Optical connector 1 of fourth embodiment of present technology
1 (7) Optical connector 1 of fifth embodiment of present technology
1 (8) Optical connector 1 of sixth embodiment of present technology
1 (9) Optical connector 1 of seventh embodiment of present technology
1 (10) Optical connector 1 of eighth embodiment of present technology <1. Optical Connector of Present Technology>

Currently, generally used optical connectors adopt a so-called physical contact (PC) type in which optical fibers are butted against each other in an optical connector.

However, there is a tendency that the core diameter decreases as the transmission capacity of an optical fiber increases. For this reason, in the PC type, the tolerance when fitting connectors is strict, which is starting to generate a mechanical limit. Furthermore, since optical connectors in general adopt a configuration in which an emission portion is exposed to the outside, foreign matters are likely to adhere, and scratches due to an external impact are likely to occur. As a measure against foreign matters, for example, a method of providing a mechanical shutter that opens and closes at the time of insertion and removal is examined; however, adoption of such a method complicates the mechanism, and thus there is concern about durability with insertion and removal.

Therefore, in recent years, a collimated coupling system has attracted attention. In the collimated coupling system, a lens is arranged with a gap on the optical axis of an optical fiber to allow light to be diffused to a size sufficiently larger than the core diameter to be converted into parallel light, and then optical coupling is performed in a contactless manner. By adopting this collimated coupling system, the influence of foreign matters can be reduced, and the tolerance at the time of fitting can be increased as compared with the PC system. The "tolerance" here means an allowable difference. For example, if the tolerance can be increased, the allowable range of a shift can also be increased.

Figure 4:
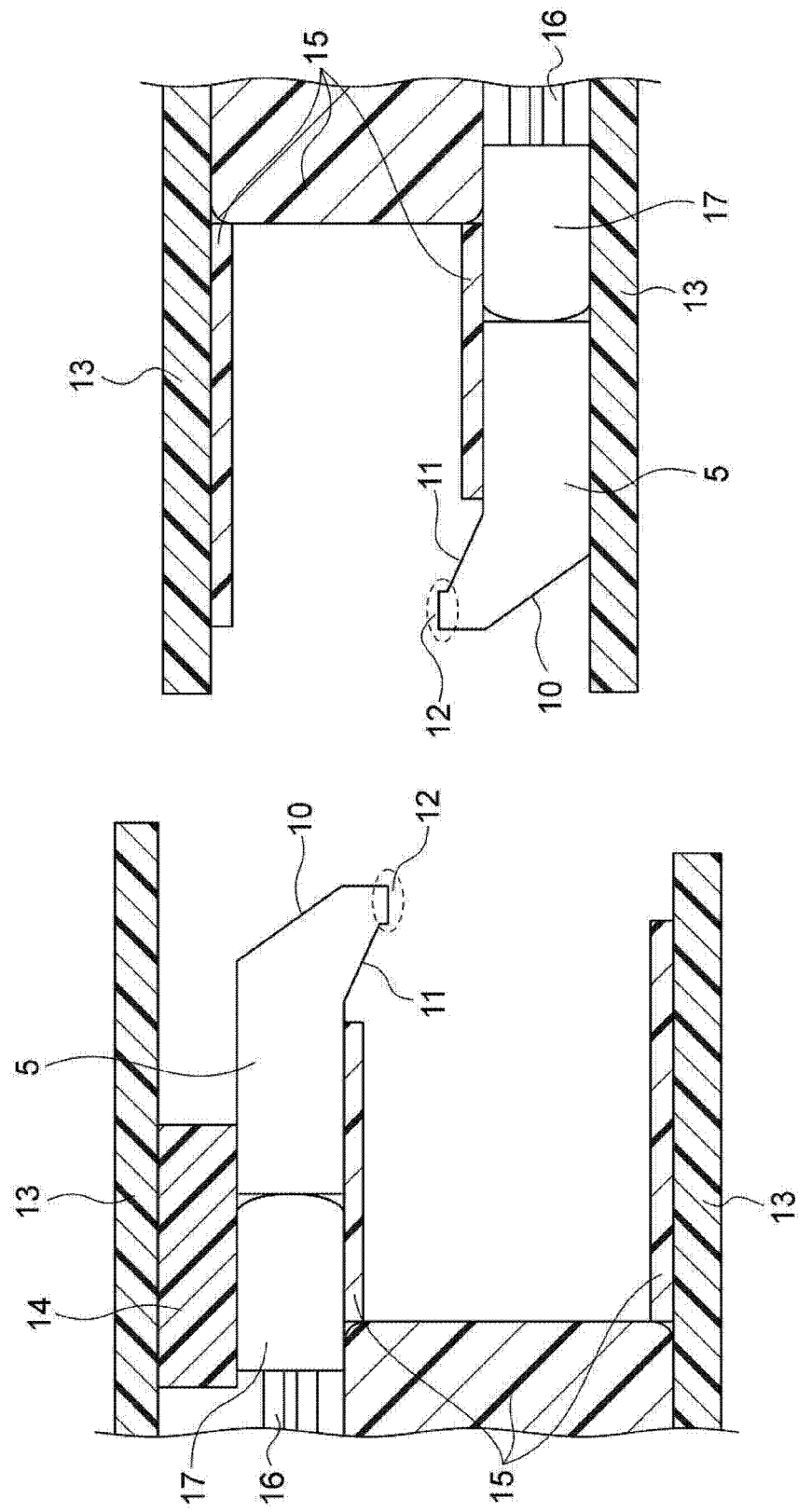
FIG. 4 is a diagram illustrating an example of the optical connector 1 of the present technology and illustrating each of an optical connector 1 on a light transmission side (plug) and an optical connector 1 on a light reception side (receptor).

For example, Patent Document 1 reports an optical connector that adopts a collimated coupling system in which protrusion and recess structures facing each other are included between an optical fiber and a collimating lens (see, for example, FIG. 4 of Patent Document 1). The optical connector of Patent Document 1 can scatter emission light by the protrusion and recess shape when not connected and can emit parallel light when the protrusion and recess structures are fitted by pressing when connected.

However, even in an optical connector that adopts the conventional collimated coupling system, including Patent Document 1, an emission portion is exposed to the outside as in the PC system, and thus foreign matters are likely to adhere, and scratches due to an external impact are likely to occur on the emission plane. For this reason, there remain concerns in terms of long-term reliability or ease of handling, such as deterioration of the connection efficiency over time or restrictions on the use environment or the work method.

In addition, the collimated coupling system is resistant in terms of attenuation even at a distance from the emission portion, and thus sufficient measures are required to satisfy standards related to laser light such as IEC 60825-1 and IEC 60825-2 depending on the intensity of the propagation light. Furthermore, since wavelengths in the near-infrared band are usually used in optical communication, it is not possible to visually confirm the emission light. Therefore, some type of countermeasure against laser hazards is indispensable for the collimated coupling system.

As the countermeasure against laser hazards, for example, it is conceivable to provide a prism, having such a refractive index that causes emission on the inner wall side of the connector, on the emission end side of the collimated light. This prism can allow collimated light to be emitted on the inner wall and to be scattered when the optical connector is not connected. In this case, a mechanicaless and simple structure can also be adopted. However, it is necessary to extend the exterior of the optical connector for the scattering, and there is a concern that the size of the optical connector in the direction in which the optical connector is inserted and removed becomes large, which is insufficient as a countermeasure against laser hazards.

As described above, the structure of the conventional optical connectors that adopt the collimated coupling system is actually vulnerable to an external impact. Furthermore, it is desirable to also consider the influence of foreign matters, a countermeasure against laser hazards, a tolerance when fitting, and durability for insertion and removal.

<1 (1) Outline of Optical Connector of Present Technology>

Therefore, as a result of diligent studies, the present inventors have devised an optical connector of the collimated coupling system, the optical connector including an optical path converting unit that emits light in an opposite direction of light propagation, the optical path converting unit having at least one or more reflection planes. This made it possible to provide an optical connector that is less affected by an external impact.

Here, conceivable is an optical connector of a collimated coupling system having a structure in which light is emitted in a direction perpendicular (90°) to the optical axis (so-called directly below or directly above) using a 45-degree prism to cause emission on the inner wall of the optical connector when not connected. In this optical connector, the acute angle portion of the prism forming 45 degrees is exposed toward the outside of the optical connector, and the emission plane is also exposed to the outside. Therefore, the present inventors consider that this optical connector has a structure that is vulnerable to an external impact from an oblique direction and that foreign matters easily adhere and accumulate when, for example, placed in the horizontal direction.

On the other hand, according to the present technology, it is possible to provide an optical connector of the collimated coupling system that is less affected by an external impact. Furthermore, with the present technology, it is possible to provide an optical connector having a practical structure that is less affected by foreign matters or an external impact while also implementing a countermeasure against laser hazards without using a mechanical mechanism. This optical connector can also be miniaturized.

Figure 2:
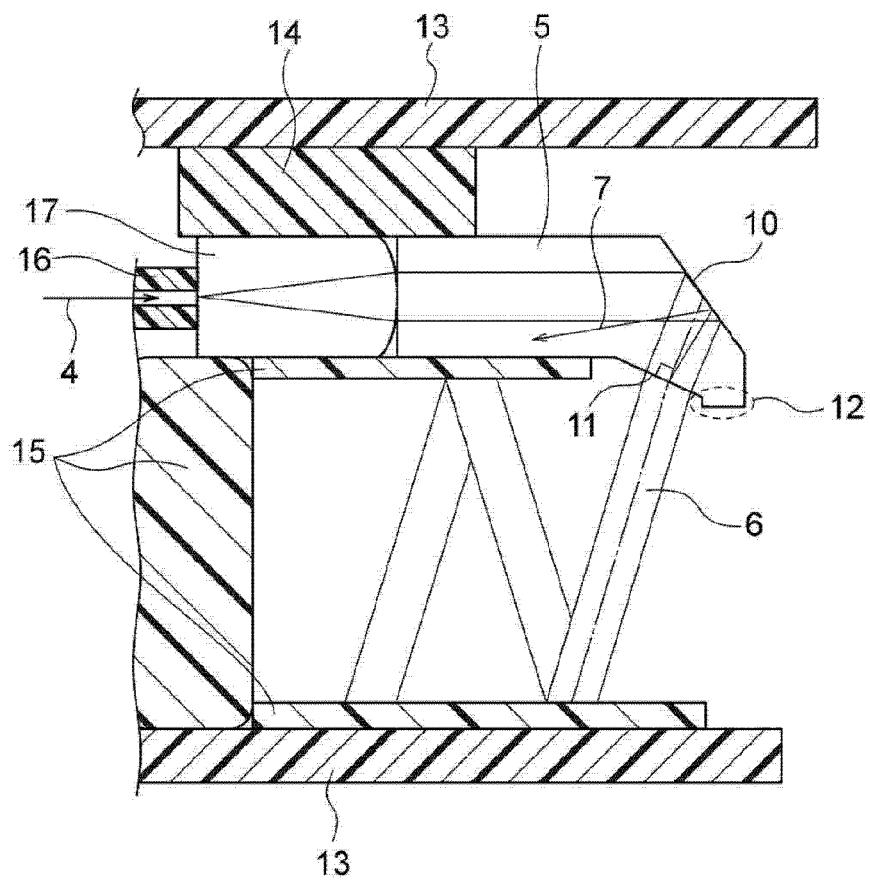
FIG. 2 is a cross-sectional view, near the center along an X direction, illustrating an example of the configuration of the optical connector 1 (when disconnected) of a first embodiment according to the present technology.
Figure 3:
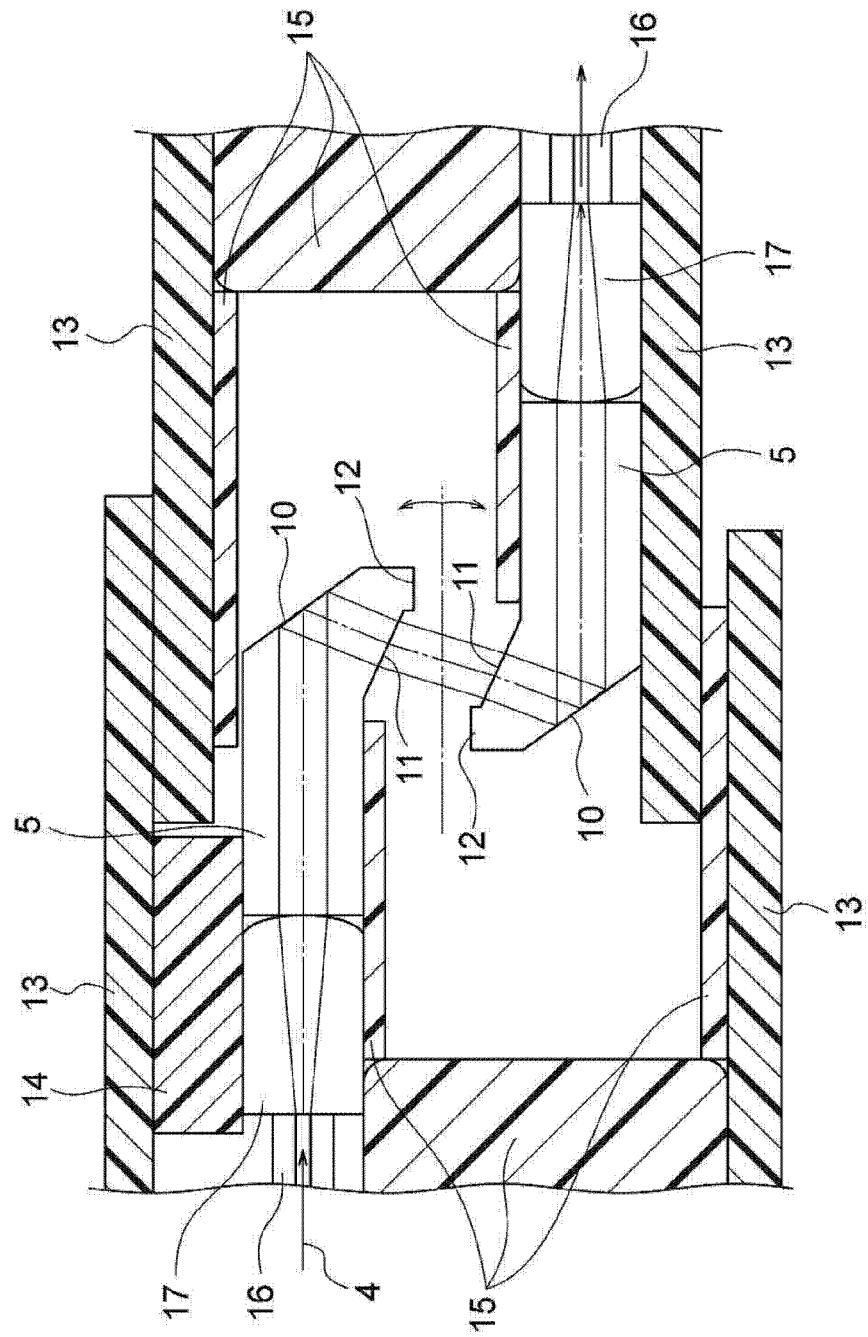
FIG. 3 is a cross-sectional view, near the center along the X direction, illustrating an example of the configuration of the optical connector 1 of the present technology at the time of coupling when the optical connectors 1 and 1 of the first embodiment according to the present technology are fitted and connected to each other.

By referring to FIGS. 1 to 3, the basic structure of an optical connector of the collimated coupling system of the present technology will be further illustrated more specifically. As a basic structure, the optical connector of the present technology can include a configuration in which an optical path from a light propagation direction can be bent at an acute angle. The optical connector of the present technology has one or a plurality of reflection planes, and with these reflection planes, it is possible to emit an optical path from the light propagation direction in the opposite direction of the light propagation. Furthermore, in the optical connector of the present technology, it is preferable to emit an optical path from a reflection plane through an emission plane, and it is more preferable that the emission plane is facing an incident plane of the other optical connector when connected with another optical connector.

In the present technology, the range in the opposite direction of light propagation is within a range of acute angles ($0°<\alpha<90°$) formed by the light propagation direction and emission light (see FIG. 1). The acute angle can be adjusted by an optical path converting unit such as a reflection plane or an emission plane. This acute angle is also an acute angle of a Z-shaped optical path that is formed when the optical connectors are connected to each other. Note that the light propagation direction is also referred to as an X-axis direction, the horizontal direction of the light propagation axis is also referred to as a Y-axis direction, and the vertical direction of the light propagation axis is also referred to as a Z-axis direction. The acute angle is, preferably, $20°<\alpha<70°$, and, more preferably, $30°<\alpha<60°$; however, this can be modified as appropriate depending on an optical connector, and the present technology is not limited thereto.

Note that FIG. 1 is a conceptual diagram when the optical connector of the present technology is taken along the X direction.

Furthermore, in the present technology, the inside of the optical connector is on the light propagation side (left side in FIG. 1) or on the inner wall side of a housing of the optical connector. In the present technology, the outside of the optical connector is on a side where there is another optical connector before connection (on the right side in FIG. 1) or on the opposite side of the inner wall side of the housing of the optical connector.

Explaining by referring to FIGS. 3 and 4, housings of both an optical connector (plug) on a light transmission side and another optical connector (receptor) on a light reception side are fitted so that the same optical structures are positioned point-symmetrically when the optical connectors of the present technology are connected to each other. By this fitting, the optical connectors can be connected to each other. Then, a Z-shaped optical path for propagating light from the light transmission side to the light reception side is formed inside the optical connectors that are connected. With this Z-shaped optical path, it is possible to propagate collimated light from the optical connector (plug) on the light transmission side to the optical connector (receptor) on the light reception side.

Furthermore, since the optical connector of the present technology adopts a configuration in which the optical path is bent at an acute angle, both of the emission plane of the optical connector on the light transmission side and the incident plane on the light reception side of the other optical connector on the light reception side are inclined so that the optical path has an acute angle. For this reason, even when the optical connectors are not connected to each other, foreign matters are unlikely to adhere even if the optical connectors are placed in any direction of the above, below, left, and right directions, and it is possible to reduce damages on the emission planes even if there are external impacts from various directions.

Furthermore, when the optical connectors of the present technology are not connected to each other, the emission light from the optical connector on the light transmission side is emitted in the opposite direction of the light propagation and is emitted to the inner wall of the housing. This makes it possible to prevent light from leaking to the outside of the housing.

Furthermore, the optical connector of the present technology can include a light shield on the inner wall of the housing in advance. By using this light shield, the emission light, at the time when the optical connectors are not connected to each other, hits on the light shield and is propagated while being attenuated, and thus the light hardly leaks to the outside of the optical connectors.

Furthermore, in the optical connector of the present technology, the emission plane faces the inside of the optical connector, and thus foreign matters are unlikely to adhere even if the connector is placed in any direction, and the emission plane is not damaged by external impacts from various directions. Therefore, the optical connector of the present technology has higher long-term reliability as compared to the conventional optical connectors, is applicable to a wide range of use environments, and can be used in various usages. With this structure, the optical connector of the present technology can achieve all of a countermeasure against laser hazards at the time of disconnection, a measure for insertion and removal durability, and a countermeasure against the effects of impact or foreign matters at the same time, while the advantage of the collimated coupling system is utilized. Furthermore, the optical connector of the present technology enables provision of a small connector having a practical structure.

Note that it is preferable that the optical connector on the light transmission side and the optical connector on the light reception side are formed so that they can be fitted to each other and that both optical connectors have the same or similar structures or shapes.

Furthermore, in FIG. 3, the light propagation is transmitted from the upper optical connector and received by the lower optical connector. However, the direction of the light propagation may be forward or reverse and is not particularly limited, and the light propagation may be transmitted from the lower optical connector and received by the upper optical connector. In a case where the direction of the light propagation is reversed, the incident plane of the lower optical connector is an emission plane, the emission plane of the upper optical connector is an incident plane, and the upper optical connector is the other optical connector. As described above, the optical connector of the present technology can be used on either the light transmission side or the light reception side and can be switched to either the light transmission side or the light reception side as appropriate for use.

In addition, the arrangement or the orientation of the optical connectors described in the drawings herein is an example, and there is no specific limitation with regards to rotation or inversion of the optical connector of the present technology such as vertical or horizontal inversion, rotation by 90° or rotation by 180° to the right or left.

The optical connector of the present technology can adopt, as an optical transmission medium, for example, an optical fiber, an optical waveguide, or a light emitting and receiving element. Furthermore, in the optical connector of the present technology, a collimating lens or other condensing lens can be adopted as the lens to be used. In addition, the optical connector of the present technology may adopt, in the optical path converting unit, a structure in which a protrusion is provided on the emission plane side, a structure in which a reflection plane is provided so that the light returns by total reflection, or a structure in which a reflection plane is included so that the light returns by a mirror (metal plating, multilayer mirror, etc.). An optical path conversion block (optical block) can be adopted in the optical path converting unit. The optical connector of the present technology can adopt, as a light-shielding material, a film, resin, or the like having an adhesive function. Furthermore, the optical connector of the present technology can adopt either a single core or a multi-core with regards to the number of cores.

The optical connector of the present technology may have a structure in which a reflection portion having a reflection plane and a support that supports the optical path converting unit are integrated. At this point, the reflection plane may be a curved surface, and/or a transmitting portion of the emission plane may be a curved surface.

Furthermore, the optical connector of the present technology may have a structure in which a lens (for example, a collimating lens) and an optical path conversion block are integrated. At this point, the reflection plane may be a curved surface, and the connection surface of an optical fiber may be a curved surface.

The optical connector of the present technology may further include a partition unit from the viewpoint of reducing the influence of foreign matters, and it is preferable that the partition unit has a function of partitioning from the outside such as a shutter function of a simple mechanism.

The optical connector of the present technology may further include a protection unit in the optical path converting unit from the viewpoint of reducing the influence of an external impact, and examples of the protection unit include, for example, coating the outside of the reflection plane with resin or bonding a plate-shaped member.

The optical connector of the present technology may adopt a structure in which a plurality of optical path converting units is arranged vertically symmetrically, which allows outlets to be reversible.

The optical connector of the present technology can adopt a configuration that reduces return light generated in the optical path converting unit. Examples of the structure for reducing the return light include a configuration in which the emission plane of the optical path converting unit is not perpendicular to the optical axis, and AR coating on the emission plane.

The optical connector of the present technology can adopt a configuration that expands the range of the optical axis tolerance of the optical fiber. Examples of a mechanism for adjusting such an optical axis tolerance include an optical fiber with a lens having a curvature or a structure in which a funnel shape is connected to the core end face. Furthermore, examples of a mechanism for adjusting the optical axis tolerance include a structure in which the optical path on the light transmission side is folded back and a structure in which the luminous flux on the light reception side is thinned and propagated. By adopting these, it is possible to miniaturize the optical connector while expanding the range of the optical axis tolerance of the optical fiber.

The effects of the present technology are illustrated below; however, the effects described herein are not necessarily limiting, and it suffices to achieve any one of the effects described in the present disclosure.

(1) By adopting the collimated coupling system, the present technology can increase the tolerance of a shift when fitting and reduce the influence of foreign matters.

(2) The present technology can achieve advantages as described below by adopting such bonding that forms a Z-shaped optical path.

It is possible to protect from a scratch on the emission plane due to an external impact and to reduce the influence of foreign matters. Thus, a high transmission quality can be maintained for a long term.

It is also possible to reduce the frequency of cleaning (cleaning-free) and to eliminate the need to select a work method or a location, thereby increasing the workability and versatility.

In addition, power consumption can be suppressed.

In addition, it is possible to protect the eyes through the countermeasure against laser hazards, thereby allowing the output to be kept constant and the transmission quality to be maintained.

Moreover, since it may be mechanicalless, it has high long-term reliability.

In addition, since the manufacture can be performed by a general process, it has a practical structure with low cost.

It can also be implemented with passive alignment, which can reduce process costs.

Moreover, since the range of the optical axis tolerance of the optical fiber can be expanded, it is possible to implement structures having a wide range of optical axis tolerances.

Furthermore, since it is also possible to reduce the return light, it is possible to stabilize the output and to reduce the noise.

The need to use other optical components such as isolators is also eliminated.

As described above, the optical connector of the present technology has higher long-term reliability as compared to the conventional optical connectors, is applicable to a wide range of use environments, and can be used in various usages.

With adoption of the above-mentioned structure as appropriate, the optical connector of the present technology is unlikely to be affected by an external impact while the advantage of the collimated coupling system is utilized.

Furthermore, with the present technology, it is possible to implement a countermeasure against laser hazards when the optical connectors are not connected to each other, to improve durability when inserting and removing, to reduce the effects of an impact or foreign matters, and to achieve all of these at the same time. Furthermore, the present technology can also provide a small-sized optical connector having a practical structure. Note that the effects described herein are not necessarily limiting, and it suffices to achieve any one of the effects described in the present disclosure.

<1 (2) Optical Connector 1 of Present Technology>

An optical connector 1 according to the present technology will be described in more detail below by referring to FIG. 1. FIG. 1 is a cross-sectional view taken along the X-axis direction near the center when the optical connector 1 is viewed from above.

The optical connector 1 of the present technology includes an optical path converting unit 5 that emits light, coming from a light propagation direction 4, in the opposite direction of the light propagation. The optical path converting unit 5 has a structure, a mechanism, the shape, or the like that allows the optical path converting unit 5 to emit light in the opposite direction of light propagation.

Here, in the optical path converting unit, one end side of a portion where light enters and is propagated is also referred to as a light propagation side, and the other end side of a portion where the light is emitted is also referred to as an emission end side. It is preferable that the light propagation side of the optical path converting unit includes a light propagation unit that is capable of propagating light. Furthermore, it is preferable that the emission end side of the optical path converting unit includes an emission portion having an emission plane, a protrusion having a configuration capable of reducing external damages to the emission portion, and a reflection portion having a reflection plane.

The cross-sectional shape (for example, see FIG. 2) when the optical path converting unit is taken along the X-axis direction is not particularly limited as long as it is formed so as to be able to emit light in the opposite direction of light propagation.

As examples of the shape of the optical path converting unit, there are cross-sectional shapes as illustrated in FIGS. 2, 5, 6, 10, and the like; however, the present technology is not limited thereto.

A suitable optical path converting unit of the present technology includes a light propagation side portion and an emission end side portion.

The light propagation side portion is a portion for propagating light from the optical fiber, and the shape is, preferably, substantially quadrangular or substantially rectangular. Furthermore, the light propagation side portion may be a combination of a substantially quadrangular shape, a substantially trapezoidal shape, a substantially triangular shape, or the like in order to form the light propagation optical path.

The emission end side portion, preferably, includes the reflection portion, the emission portion, the protrusion, and the like, and the shapes thereof are not particularly limited.

The reflection portion is a portion that reflects the light that is propagated, and the shape is, preferably, a substantially trapezoidal. It is preferable that the shape of the reflection portion is such that a part of the upper surface thereof is inclined diagonally downward to the right and that the inclined portion serves a reflecting region for reflection to the emission plane.

The emission portion is a portion that emits the reflected light, and the shape thereof is, preferably, substantially triangular. As for the shape of the emission portion, it is preferable that the lower surface thereof is inclined diagonally downward to the right and that this inclined plane serves as an emitting region.

The protrusion is a portion for, for example, protecting the emission plane, and the shape thereof is, preferably, substantially quadrangular. The shape of the protrusion is, preferably, such that it protrudes further downward from the end of the emission plane.

It is preferable that the optical path converting unit has at least one or more reflection planes. It is preferable that one or a plurality of reflection planes is arranged in the optical path converting unit at positions where light in the light propagation direction can be emitted in the opposite direction of the light propagation direction. Examples of the positions where the reflecting surfaces are arranged include a diagonally inclined portion of the reflection portion. As a result, the influence of external impacts can be reduced.

It is further preferable that the optical path converting unit can emit light toward another optical path converting unit. At this point, the other optical path converting unit is present when the optical connector is connected with the other optical connector and is not present when they are not connected. When the optical connectors 1 and 1 are connected to each other, it is preferable that the optical path converting units 5 and 5 of the optical connectors 1 and 1 form a Z-shaped optical path. As a result, the light can be propagated from the light transmission side to the light reception side by the collimated coupling system.

Furthermore, it is preferable that at least one reflection plane and at least one emission plane are included on the emission end side of the optical path converting unit.

The reflection plane on the emission end side is, preferably, inclined so as to be able to emit light in the opposite direction of light propagation, and an optical path 6 can be formed with light emitted from the reflection plane.

It is preferable that the emission plane on the emission end side can emit the light that is reflected by the reflection plane on the emission end side. At this point, it is preferable that the emission plane is disposed at a position where the light emitted by the reflection plane can be emitted. It is preferable that the emission plane on the emission end side is inclined so as to be able to emit light in the opposite direction of light propagation. The light emitted from the emission plane can be emitted in the opposite direction of the light propagation. In addition, from the viewpoint of reducing return light, it is preferable that the emission plane is not perpendicular to the optical axis or is applied with AR coating.

Examples of the optical path converting unit that is suitable include an optical path conversion block including a transparent member, an optical path converting unit provided inside a support, an optical path conversion member having a protrusion protruding from an emission plane or an incident plane, an optical path converting unit having a mechanism for forming collimated light, and an optical path converting unit including a protection unit. For these optical path converting units, for example, FIGS. 2, 5, 6, 10, 13, 14, 16, and 20 can be referred to. However, an optical path converting unit of the present technology is not particularly limited thereto. Furthermore, each of these characteristic configurations (for example, structure, mechanism, shape, etc.) may be combined as appropriate. By forming an optical path converting unit or a collimated light forming mechanism in a support, an optical connector can be easily manufactured from the viewpoint of reduction in the number of parts or ease of work, and the cost can also be reduced. Furthermore, by forming a protection unit such as exterior resin coating or member installation, the influence of an external impact can be reduced. Note that the characteristic configuration will be described more specifically in respective embodiments described later.

As arrangement of the optical path converting units that are preferable, it is preferable to arrange optical path converting units of optical connectors, which are connected, vertically symmetrically. Two or more optical path converting units may be provided in one optical connector on the light transmission side or the light reception side. It is preferable to arrange a plurality of optical path converting units on the light reception side so that light from a plurality of optical path converting units on the light transmission side can be received. Due to this, by making the insertion ports of the optical connectors reversible, the direction of an insertion port becomes clear, thereby facilitating the insertion work when the optical connectors are fitted (see, for example, FIG. 14 or 15).

Furthermore, it is preferable that the optical connector 1 of the present technology includes a housing for storing the optical path converting unit and a support for supporting the optical path converting unit. It is more preferable that the optical connector 1 of the present technology includes a light shield, a partition unit that partitions the optical connector from the outside, and an optical axis tolerance adjusting mechanism of an optical fiber. By providing a partition unit, the influence of foreign matters can be reduced. Regarding these, for example, FIGS. 2, 11, 18, and 20 can be referred to. By providing a mechanism for adjusting the optical axis tolerance in optical fibers, it becomes possible to expand the range of the optical axis tolerance in optical fibers and to miniaturize optical connectors. These units, mechanisms, and the like will be described more specifically in each embodiment described later.

The present technology can provide an optical connector of the collimated coupling system that is less affected by an external impact due to a configuration that enables emission of light in the opposite direction of light propagation. An optical connector of the present technology can implement an excellent countermeasure against laser hazards. An optical connector of the present technology can adopt a simpler structure. The size can be reduced when optical connectors of the present technology are connected to each other as compared with conventional optical connectors that are connected. An optical connector of the present technology can have a wider range of optical axis tolerance than conventional optical connectors. An optical connector of the present technology is less affected by foreign matters. An optical connector of the present technology has excellent insertion and removal durability. Furthermore, an optical connector of the present technology can further expand the range of the optical axis tolerance. Note that the effects described herein are not necessarily limiting, and it suffices to achieve any one of the effects described in the present disclosure.

<1 (3) Optical Connector 1 of First Embodiment of Present Technology>

Hereinafter, a first embodiment of the present technology will be described in more detail by referring to FIGS. 2 to 5; however, the present technology is not limited thereto. The description of a configuration overlapping with the configurations of <1 (1)> and <1 (2)> described above will be omitted as appropriate.

The optical connector 1 according to the first embodiment of the present technology includes a first optical path converting unit 5 that emits light in the opposite direction of light propagation, and the first optical path converting unit 5 includes a reflection plane 10 and an emission plane 11 on an emission end side of the first optical path converting unit.

It is preferable that the optical connector 1 of the first embodiment further includes a housing 13 capable of storing respective units of the first optical path converting unit, a support 14 that supports the first optical path converting unit, light shields 15, an optical fiber 16, and a collimating lens 17.

It is preferable that the optical connector 1 includes an optical path forming unit that can propagate light, such as the optical fiber 16, the collimated light forming mechanism, and the first optical path converting unit 5. The optical path forming unit can arrange the optical fiber 16, the collimating lens 17, and the first optical path converting unit 5 in the order mentioned. The optical path forming unit may be fixed and supported in the housing by the support 14 or the light shields 15.

As illustrated in FIGS. 3 and 4, as the optical connector 1, there are an optical connector 1 on the light transmission side and an optical connector 1 on the light reception side, and when these are fitted and connected, it becomes possible to propagate light from the light transmission side to the light reception side. Furthermore, it is important that the configurations of the both optical connectors 1 and 1 are such that a Z-shaped optical path can be formed when these optical connectors are fitted and connected.

Here, an optical path converting unit of the optical connector on the light transmission side is referred to as a first optical path converting unit, and an optical path converting unit of the other optical connector on the light reception side is referred to as a second optical path converting unit. Likewise, the optical connector on the light transmission side is also referred to as a first optical connector, and the optical connector on the light reception side is also referred to as a second optical connector.

Note that, since the concept of the optical connector on the light reception side is substantially the same as the concept of the optical connector on the light transmission side, the configuration of the optical connector on the light reception side can employ the same or a similar structure as or to that of the optical connector on the light transmission side. The optical connector on the light reception side can converge collimated light received from the optical connector on the light transmission side to obtain convergent light and transmit the convergent light by an optical cable connected thereto. Note that the description of the configuration of the optical connector on the light reception side that overlaps with the configuration of the optical connector on the light transmission side will be omitted as appropriate.

Meanwhile, in the present technology, although there are cases where an optical path converting unit, an optical connector, etc. are attached with a term such as first, second, one, or another for the sake of convenience; however, an optical connector of the present technology can be used on a light transmission side or a light reception side, or on both. Therefore, terms such as first or second do not limit the interpretation of an optical connector of the present technology to only on the light transmission side or only on the light reception side.

<First Optical Path Converting Unit>

It is preferable that the first optical path converting unit 5 is configured to emit light toward the second optical path converting unit that is present when the optical connector is connected with the other optical connector.

The first optical path converting unit 5 has one or more reflection planes 10. The one or a plurality of reflection planes 10 is arranged so as to be able to emit light in the opposite direction of the light propagation direction by reflecting or while reflecting light from a light propagation direction 4 (for example, see FIG. 2 or 5).

The reflection of the reflection plane 10 can be performed by using, for example, a prism reflecting mechanism or a mirror reflecting mechanism using a metal film or the like but is not particularly limited thereto. Moreover, the reflection plane 10 can be included inside and/or provided outside the first optical path converting unit 5.

As a method of forming the reflection plane 10, as an example, a reflection mirror may be attached on the outer surface of the emission end side of the first optical path converting unit, or a metal film may be deposited on the outer surface of the emission end side. A reflection mirror or a metal film can be provided on the outside to reflect light. Meanwhile, the reflection plane 10 may be a flat surface or a curved surface.

Furthermore, as a method of forming the reflection plane 10, as an example, a prism or a reflection mirror may be disposed on the emission end side of the first optical path converting unit. A reflection prism or a reflection mirror can be included inside to cause light to be reflected by using the critical angle of the prism or the reflection mirror.

The reflection plane 10 preferably, includes a material that can reflect light, and vapor deposition of a metal film such as an aluminum film, a multilayer mirror, or the like may be used; however, the present technology is not limited to these materials. Furthermore, in a case where total reflection conditions are satisfied, the mirror on the reflection plane may be omitted. As a result, the first optical path converting unit can emit light in the opposite direction of light propagation.

It is preferable that the inclination of the reflection plane 10 on the emission end side of the first optical path converting unit is inclined so that light can be emitted in the opposite direction of the light propagation. The optical path 6 is formed with the light emitted from the reflection plane 10 on the emission end side (see FIG. 2). Furthermore, it is more preferable that the reflection plane 10 on the emission end side is a mirror surface (for example, a total reflection plane).

It is preferable that the first optical path converting unit 5 has the emission plane 11 from which the light reflected by the reflection plane 10 on the emission end side is emitted. It is preferable that the emission plane 11 is formed on the emission end side and that the inclination of the emission plane 11 is inclined so that the light can be emitted in the opposite direction of light propagation. It is further preferable that the emission plane 11 has a structure that is not perpendicular to the optical axis from the reflection plane. It is more preferable that the emission plane 11 is inclined so as not to be perpendicular to the optical path from the reflection plane 10, and this inclination angle can be adjusted by the angle of the inclination of the emission plane. By adjusting the angle of the emission plane, it is possible to reduce the return light and to suppress deterioration of the light quality. Furthermore, it is preferable that antireflection (AR) coating for reducing the return light is applied on the outer surface of the emission plane 11. Furthermore, the emission plane 11 or a light transmitting portion (transmitting surface) thereof may be a flat surface or a curved surface.

The light emitted from the emission plane 11 can be emitted in the opposite direction of the light propagation. It is further preferable that the inclination of the reflection plane 10 that emits light onto the emission plane 11 is inclined so that light can be emitted in the opposite direction of the light propagation. Furthermore, it is preferable that the inclination of the emission plane 11 on the light transmission side is parallel to the inclination of the incident plane on the light reception side when connected with the other optical connector.

<Optical Path Conversion Prism>

Preferable as the first optical path converting unit is an optical path conversion block such as an optical block including a transparent member. The optical path conversion block can be manufactured by molding, cutting, or the like, and it is desirable that the material used has a small attenuation factor with respect to the wavelength used.

It is preferable that a prism is used for the first optical path converting unit 5, thereby enabling efficient formation of an optical path. Note that the same or a similar structure, material, or the like as or to that of the first optical path converting unit 5 may be used also for the second optical path converting unit 5.

Furthermore, it is preferable to provide a protrusion 12 on the emission end side of the first optical path converting unit, which has advantages such as that the emission plane 11 is likely to be shadowed and that the influence of an external impact or foreign matters can be reduced. Furthermore, it is preferable that the first optical path converting unit has the protrusion 12 (for example, a protrusion like an eave) so as to protrude with respect to the emission plane. The protrusion 12 is, preferably, formed so as to project from the emission plane 11 in the lateral direction. The lateral direction refers to a direction perpendicular to the light propagation axis (for example, the Z-axis direction). Furthermore, it is preferable that the protrusion 12 protrudes in a direction in which the other optical connector is present (for example, downward). Since there is a protrusion, an external impact on the emission plane can be reduced, and foreign matters and the like are less likely to adhere to the emission plane. Furthermore, it is preferable that the protrusion 12 is formed so as to have a thickness in the outer direction (X-axis direction) from the emission plane 11. Since there is a thick portion, the influence of an external impact from the outside can be further reduced.

An optical element material can be used as the material of the prism, and this material can be used to obtain a transparent member. The prism, preferably, includes a material that can efficiently transmit light such as collimated light. Examples include a transparent resin material such as polycarbonate, a glass material such as BK7, synthetic quartz, anhydrous synthetic quartz, or alkali aluminosilicate, or other transparent inorganic materials. For example, polycarbonate is excellent in mechanical strength, workability, and transparency. Note that, in the present technology, it is possible to use these materials as materials of optical element members (for example, lenses and mirrors) for forming an optical path.

Meanwhile, the shape of the prism is not particularly limited. For example, as the shape of the prism, an inclined plane is formed outside a surface on the emission end side where the light propagated in the X-axis direction arrives. It is preferable that the inclined plane is inclined so that light from the light propagation direction can be easily emitted in the opposite direction of the light propagation. It is preferable that the inclined plane is formed so as to be wider than the width of the light that is propagated. On the inclined plane, it is possible to let a portion, which is irradiated with the light that is propagated, to function as the reflection plane 10.

The prism further includes an inclined plane as the emission plane 11, and the inclined plane can emit light from the reflection plane 10 onto an incident plane of the other optical path converting unit. It is preferable that a protection unit such as protective coating or installation of a protective member for reduction of an external impact is provided on the emission plane 11 or in the vicinity thereof (for example, on the emission end side). Furthermore, coating for reduction of an external impact may be applied on the entire surface of the prism. Examples of the coating for mitigating an external impact include photocurable resin (visible-light-curable or ultraviolet-curable) coating. Meanwhile, examples of the protective member include an elastic part such as a photocurable resin member or rubber.

<Protrusion>

Furthermore, it is preferable that the protrusion 12 for reducing an external impact is formed in a substantially vertical direction under the reflection plane 10 and the emission plane 11 on the emission end side (see, for example, FIG. 2). It is preferable that the protrusion 12 is formed in a substantially vertical direction from the outer portion of the first optical path converting unit where the reflection plane 10 is located. An inclined plane along the reflection plane 10 may be included on the outer portion of the first optical path converting unit. Furthermore, it is preferable that the protrusion 12 is formed so as to protrude with respective to the emission plane 11 on the emission end side and in the lateral direction (Z-axis direction). Furthermore, it is preferable that the protrusion 12 is formed in a substantially vertical direction below the emission plane 11, and it is more preferable that the protrusion 12 has a shape that protrudes from the lowermost end of the inclined plane of the emission plane 11. It is further preferable that the protrusion 12 has a thickness in the direction toward the outside (X-axis direction). By arranging the protrusion 12 on the outer side of the emission plane 11, the emission plane 11 is not directly exposed to the outside, and thus it is possible to further prevent scratches or attachment of foreign matters on the emission plane 11.

<Housing>

The optical connector 1 of the first embodiment of the present technology, preferably, includes the housing 13. The first optical path converting unit 5 is stored in the housing 13. The first optical path converting unit 5 is, preferably, stored at one end in the housing 13.

It is preferable that the optical connector 1 includes the support 14 for supporting the first optical path converting unit 5 and the light shields 15 in the housing 13. It is preferable that the first optical path converting unit 5 is disposed between the support 14 and the light shields 15, and it is more preferable that the first optical path converting unit 5 is fixed between the support 14 and the light shields 15.

It is preferable that the optical connector 1 includes an optical path forming member such as the optical fiber 16 in the housing 13. An optical path forming member such as the collimating lens 17 for collimating light from the optical fiber may be further provided.

The material of the housing 13 may include a synthetic resin or the like without being particularly limited and can be obtained by, for example, injection molding or mold forming. Furthermore, the housing may be applied with antireflection coating (antireflection film or the like), or a material of a light shielding member may be used as the material of the housing.

The shape of the housing 13, preferably, has a space inside in which the first optical path converting unit and other components can be stored, and has, for example, a box shape (for example, a substantially quadrangular shape (substantially rectangular shape)) or a tubular shape (for example, a cylindrical shape); however, the shape is not limited thereto.

It is preferable that the housing (for example, box type or tubular type) 13 includes an opening into which another optical connector can be inserted. It is preferable that the housing 13 includes an opening that enables connection with an optical fiber. It is further preferable that the housing 13 has such a shape that light does not enter the fitted housings from the outside when optical connectors are connected to each other and two housings are fitted. The present technology has an advantage that the number of items can be reduced since it is sufficient to combine two optical connectors, and it is not necessary to use a separate coupling adapter between the optical connectors.

<Light Shield>

The light shields 15 are, preferably, provided inside the housing 13 and are, preferably, formed on the inner wall of the housing. It is further preferable that the light shields 15 have a shape capable of supporting an optical path forming unit such as the first optical path converting unit, the collimating lens, or the optical fiber. Examples of the shape include a box type and a tubular type, and it is preferable to include an opening into which an optical path converting unit of another optical connector can be inserted. More specifically, for example, a U-shape, an L-shape, or the like are conceivable.

As the role of the light shields 15, it is possible to attenuate irradiation light itself from the optical fiber that is reflected at an acute angle on the reflection plane. By bending the optical path from the light propagation direction at an acute angle toward the inside of the optical connector, the light is emitted toward the inside of the optical connector, and thus this light can be absorbed by the light shields provided on the inner wall or the like of the housing. With the light shields absorbing the light, the emitted light does not go out of the optical connector, and thus there is an advantage that a countermeasure against laser hazards can be taken.

The light shields 15 may be formed into desirable shapes from a light-shielding material or may be obtained by forming a light-shielding material on the surface of a component such as synthetic resin. The light-shielding material is not particularly limited, and examples include metals such as tungsten (W) and aluminum (Al) and organic materials such as carbon black and black titanium oxide.

Furthermore, by adding adhesiveness to the light shields 15, a material capable of trapping dust, such as foreign matters, at this adhesive portion, may be adopted. Examples of items that impart adhesiveness include films and resins.

Adhesive substances are not particularly limited, and examples include a hydrophilic polymer that functions as an adhesive. Examples of the hydrophilic polymer include polyethylene glycol (PEG), polypropylene glycol (PPG), polyvinyl alcohol (PVA), polyamide, and vinylpyrrolidone homopolymer.

<Optical Path Forming Unit>

It is preferable to further include the optical fiber 16 in the optical path forming unit, and the optical fiber 16 is an example of another optical component that can be used for formation of the optical path. Examples of other optical parts include various optical elements such as optical waveguides, light emitting diodes, semiconductor lasers, lenses, and prisms.

The collimating lens 17 is not particularly limited as long as it is capable of forming collimated light. In the present technology, it is preferable to include a collimated light forming mechanism as appropriate, without being limited to a collimating lens.

Generally, by using a collimating lens (collimated light forming mechanism) for light from the optical fiber, it is possible to cause the light from the optical fiber to be diffused to achieve a parallel luminous flux state. By using the collimating lens on the incident side, it is possible to transmit light, in which parallel luminous flux is converged, to the optical fiber. Such a collimated coupling system has advantages that the tolerance for a shift in the fitting may be large and that the influence of foreign matters is small.

Meanwhile, it is necessary to take a countermeasure against laser hazards since collimated light is a laser beam in a parallel state; however, the present technology can also take a countermeasure against laser hazards.

<Optical Connector when Connected>

Illustrated in FIG. 3 are the optical connectors when the optical connector 1 of the first embodiment of the present technology and the other optical connector 1 are connected to each other.

A second optical path converting unit 5, a housing 13, light shields 15, an optical path forming unit (optical fiber 16, collimating lens 17, etc.) and other components in the other optical connector 1 are similar to the components of the optical connector 1 described above.

In FIGS. 3 and 4, the other optical connector 1 does not include a support 14; however, a support 14 may be included in the optical connector as appropriate if necessary. Furthermore, the light shields 15 may support the second optical path converting unit 5.

The second optical path converting unit 5 of the other optical connector 1 may be fixed to the housing 13 without a support 14 sandwiched therebetween or may be supported by the light shields 15 and fixed in the housing 13.

Furthermore, an end portion of the support 14 of the optical connector 1 may serve as a stopper for stopping a front end of the housing of the other optical connector 1 when the optical connectors are joined to each other. The optical connectors may further include a portion (for example, a locking portion or a stopper portion) for adjusting the positional relationship when the optical connectors are fitted and connected. As the adjustment portion, for example, a locking portion for locking the housings with each other or a stopper portion for stopping a front end portion of a housing that is inserted may be included in the optical connector.

Furthermore, it is preferable that the height (Z-axis) inside the housing 13 of the optical connector is larger than the height (Z-axis) inside the housing 13 of the other optical connector, which can reduce the size of the optical connectors 1 and 1.

The optical connector 1 of the first embodiment of the present technology, preferably, includes the optical fiber 16, the collimating lens 17, the first optical path conversion block 5, the housing 13, the support 14, and the light shields 15. A quadrangular optical waveguide may be used instead of the optical fiber 16.

<Example 1 in First Embodiment of Present Technology>

Figure 5:
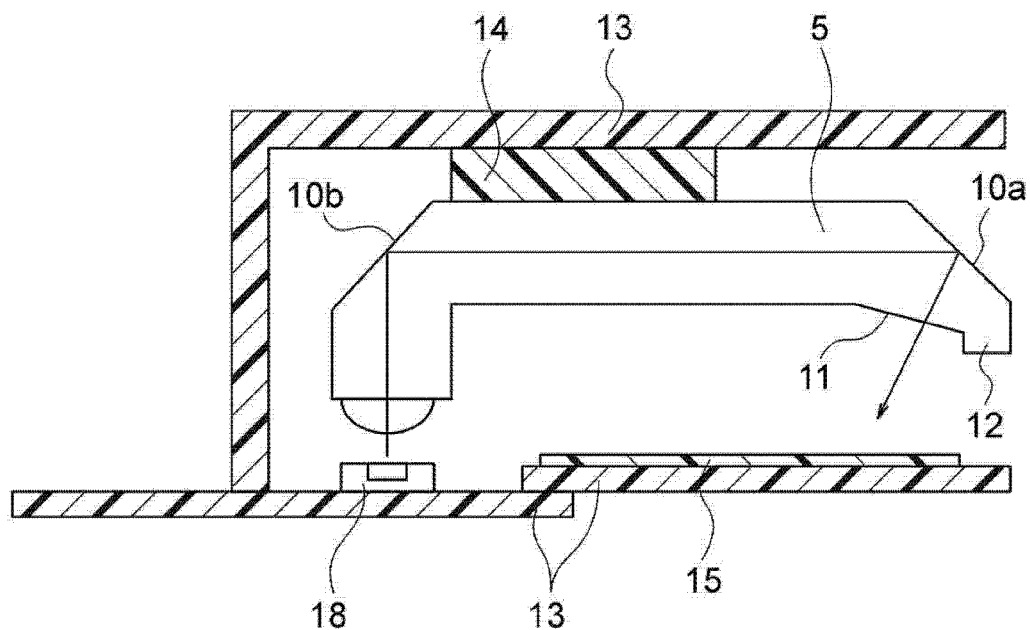
FIG. 5 is a diagram illustrating a modification (optical connector in a case where a light emitting and 30 receiving element is used) of the first embodiment of the present technology.

An example of the first embodiment of the present technology will be described; however, the present technology is not limited thereto. As illustrated in FIG. 2, the structure of the present technology includes, as its minimum structure, the optical fiber 16, the collimating lens 17, the optical path conversion block 5, the support (housing) 13, and the light shields 15. A quadrangular optical waveguide may be used instead of the optical fiber, and there is no problem if a 45-degree mirror and a light emitting and receiving element 18 are combined as illustrated in FIG. 5. The collimating lens is not limiting either, and a general lens having a curvature that collects or diverges light may be used. The optical block 5 used in the optical path conversion block can be manufactured by molding, cutting, or the like, and it is desirable that the material used has a small attenuation factor with respect to the wavelength used. The reflection plane may be a vapor-deposited metal film such as aluminum, or a multilayer mirror or the like may also be used. Furthermore, if the total reflection condition is satisfied, a mirror of the reflection plane 10 can be omitted. Providing the protrusion 12 like an eave on the emission end side of the optical path conversion block 5 can reduce the influence of an external impact or foreign matters since the emission plane 11 is shadowed. It is desirable that the protrusion 12 protrudes depending on the size of the optical connector. The light-shielding material of the light shields 15 may be any material as long as the material adheres to the inner wall, such as a film type or resin. Furthermore, by adding adhesiveness to the light-shielding material, it is possible to impart a role as a dust trap for adsorbing foreign matters, and thus it is possible to prevent circulation of foreign matters in the connector and to reduce the influence of the foreign matters. Note that this shape is not limited by the number of cores.

As described above, an optical connector of the present technology has high long-term reliability, is applicable to a wide range of use environments, and can be used in various usages. The present technology has an advantage of being less affected by an external impact while leveraging the advantage of the collimated coupling system.

Furthermore, with the present technology, it is possible to implement a countermeasure against laser hazards when the optical connectors are not connected to each other, to improve durability when inserting and removing, to reduce the effects of an impact or foreign matters, and to achieve all of these at the same time. Furthermore, the present technology can also provide a small-sized optical connector having a practical structure. An optical connector of the present technology can have a wider range of optical axis tolerance than conventional optical connectors. Note that the effects described herein are not necessarily limiting, and it suffices to achieve any one of the effects described in the present disclosure.

Moreover, similar effects to those of the above-described first embodiment can be obtained also in a modification of the first embodiment as described later.

<Modification of First Embodiment>

Illustrated in FIG. 5 is an example of a modification of the first embodiment of the present technology. It is preferable that an optical connector 1 of the modification includes a housing 13 capable of storing a first optical path converting unit 5, a support 14 for supporting the first optical path converting unit 5, and light shields 15. The number of reflection planes used in the first optical path converting unit of the optical connector 1 of the modification is not particularly limited. The description of a configuration overlapping with the configuration of the optical connector described above will be omitted as appropriate.

FIG. 5 is a diagram illustrating a case where a light emitting and receiving element is installed instead of the optical fiber 16 of the optical path forming unit. The optical connector 1 of the modification, preferably, includes an optical path forming unit including at least an optical path portion including a reflection plane 10b for reflecting light from a light emitting and receiving element 18 toward an emission end side and the first optical path converting unit 5 including a reflection plane 10a.

As illustrated in FIG. 5, the reflection plane 10b reflects the light from the light emitting and receiving element 18 and thereby forms an optical path. The reflection plane 10b may be included inside the first optical path conversion block 5. Alternatively, a reflection plane 10b or a block having this reflection plane may be provided separately from the first optical path conversion block, and the optical path may be formed by combining the first optical path conversion block and the block having the reflection plane 10b.

Moreover, it is preferable that the optical connector 1 of the modification includes a collimated light forming mechanism (for example, a forming lens) in the optical path forming unit. The optical path converting unit may be one in which at least an optical path unit including the reflection plane 10b and the first optical path converting unit are integrally formed or may include a plurality of number of parts. It is preferable to use an optical block as the material of the optical path forming unit.

In the optical connector 1 of the modification, light is emitted from the light emitting and receiving element 18 to the optical block of the optical path forming unit, and collimated light is formed. Then, the light is reflected in the direction of the reflection plane 10a on the emission end side by the reflection plane 10b in the first optical path forming unit. The light reflected by the reflection plane 10a is emitted to an emission plane 11, and the light is emitted from the emission plane 11 in the opposite direction of the light propagation. The light emitted has been converted into collimated light by the collimated light forming mechanism included on the optical path. The light emitted enters an incident plane 11 of a second optical path converting unit that is present when coupled therewith and is propagated to the optical connector on the light reception side. In this manner, a Z-shaped optical path is formed when the optical connectors are connected to each other, and light of the collimated coupling system is propagated from the light transmission side to the light reception side. The collimated light becomes converged light on the light reception side and is transmitted by an optical cable of optical fibers.

<1 (3) -2 Example of Manufacturing Method of Optical Connector of First Embodiment>

Note that, in general, including the first embodiment, the optical connector 1 of the present technology can be easily manufactured by arranging and combining respective parts in a predetermined arrangement.

For example, as for the housing 13, for example, parts A and B can be manufactured by mold forming. In this case, the part A can be molded in a shape in which the walls in the Y-axis direction are open, and the part B can be molded in a shape of the walls in the Y-axis direction. Then, respective parts such as an optical fiber are arranged at predetermined positions on the part A whose walls in the Y-axis direction are open and fixed with an adhesive, a screw, or the like, and then the part B is fixed to an end of the part A by an adhesive or the like, thereby enabling manufacture of the optical connector 1. Even when compared with the parts of Patent Document 1, the parts of the optical connector 1 of the first embodiment of the present technology do not complicate the shape of the respective parts, and the number of parts can be reduced. Therefore, the manufacture of the optical connector 1 of the present technology is excellent in terms of reduction of the number of work processes, lowering the work difficulty, or cost reduction.

<1 (4) Optical Connector 1 of Second Embodiment of Present Technology>

Hereinafter, a second embodiment of the present technology will be described in more detail by referring to FIGS. 2 to 9; however, the present technology is not limited thereto. The description of a configuration overlapping with the configurations of <1 (1)> to <1 (3)> described above will be omitted as appropriate.

An optical connector 1 according to the second embodiment of the present technology includes a first optical path converting unit 5 having one or more reflection planes 10, and the first optical path converting unit 5 emits light in an opposite direction of light propagation. The first optical path converting unit 5 is included inside a support 14 of the second embodiment and has, inside the support 14, at least one or more reflection planes 10 that reflect light in the opposite direction of the light propagation. With this configuration, the first optical path converting unit 5 of the second embodiment is formed.

The optical connector 1 of the second embodiment, preferably, further includes a housing 13 capable of storing respective parts of the first optical path converting unit and other components, a light shield (not illustrated), an optical fiber 16, a collimated light forming mechanism, or an optical path forming unit. It is also preferable that the optical path forming unit including the optical fiber 16, a collimating lens 17, and the like is included inside the first optical path converting unit 5 of the second embodiment. Moreover, although the first optical path converting unit 5 of the second embodiment is integrated with the support, the support 14 may be separately provided for position adjustment for the housing 13 or formation of the optical path.

Figure 6:
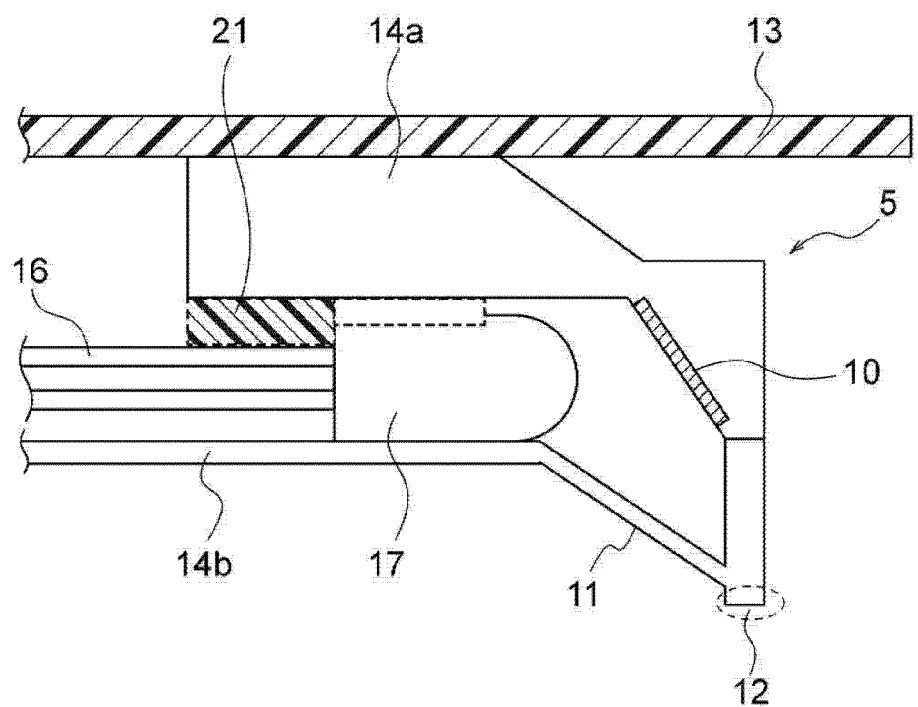
FIG. 6 is a cross-sectional view illustrating an example of a configuration of a part of an optical connector 1 (when disconnected) of a second embodiment of the present technology.

As illustrated in FIG. 6, in the second embodiment of the present technology, it is preferable that the support that supports the first optical path converting unit includes a support 14*a* that is integrated with the reflection plane 10, an optical fiber support 21 having a groove (preferably a V-groove) for fixing the optical fiber 16 and the collimating lens 17, and a support 14*b* having an emission plane 11. As a result, the optical fiber and the collimating lens can be fixed by passive alignment on the basis of the same support as a reference, and thus the process of positioning the respective elements can be simplified. As for the emission plane 11, a separate body can be fitted or bonded to the support 14*b*, thereby allowing the emission plane to be sealed. As for the reflection plane 10, a separate body can be fitted or bonded to the support 14*a*, thereby enabling formation of the reflection plane. Furthermore, since collimated light can be formed by making a mirror plane a curved surface (see FIG. 9) or making the emission plane 11 a curved surface, it is possible to omit the collimating lens. With this configuration, all the supports can be integrally molded to achieve the manufacture with good position accuracy.

Figure 9:
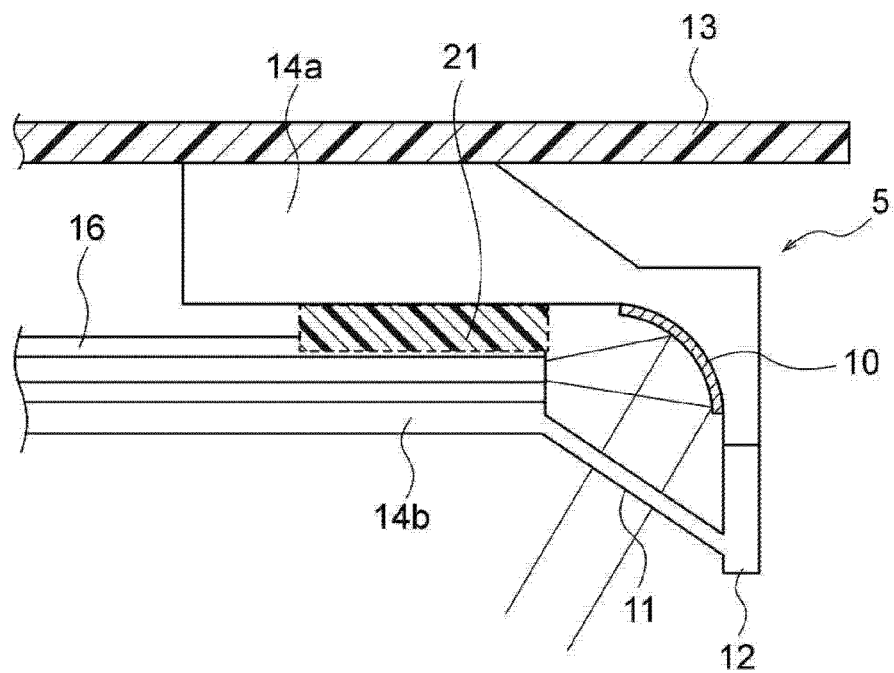
FIG. 9 is a cross-sectional view illustrating an example of the configuration of a part of a modification (when disconnected) of the optical connector 1 of the second embodiment of the present technology. The cross-sectional view illustrates a modification of a first optical path conversion block used in the optical connector 1 of the second embodiment of the present technology.

Furthermore, as illustrated in FIGS. 6 and 9, the optical connector 1 of the second embodiment of the present technology can include the first optical path converting unit 5 inside the support 14 that can be manufactured of synthetic resin or the like, and as a result, the first optical path converting unit 5 of the second embodiment can be formed. As described above, the shape of the respective parts is not complicated, and the number of parts can be reduced. Moreover, since a reflection mirror can be used without using an optical prism, it is more advantageous from the viewpoint of cost reduction. Furthermore, the work difficulty is low since it suffices to mold a synthetic resin instead of manufacturing an optical prism, which is more difficult. In addition, in a case where the support 14 is manufactured, a housing portion of the first optical path converting unit 5 is also manufactured, and thus the number of work processes can be reduced.

Furthermore, the support 14 or the support 21 may be a transparent member (preferably a transparent resin material or the like) using the same optical element material as the first optical path converting unit described above.

In any case, each of the supports of the second embodiment of the present technology can be obtained by a general molding method, and thus it is low-cost and is excellent in mass productivity.

<1 (4) -2 Example of Manufacturing Method of Optical Connector of Second Embodiment>

An example of the manufacturing method and manufacturing processes of the optical connector according to the second embodiment of the present technology will be illustrated; however, the present invention is not limited thereto.

Figure 7:
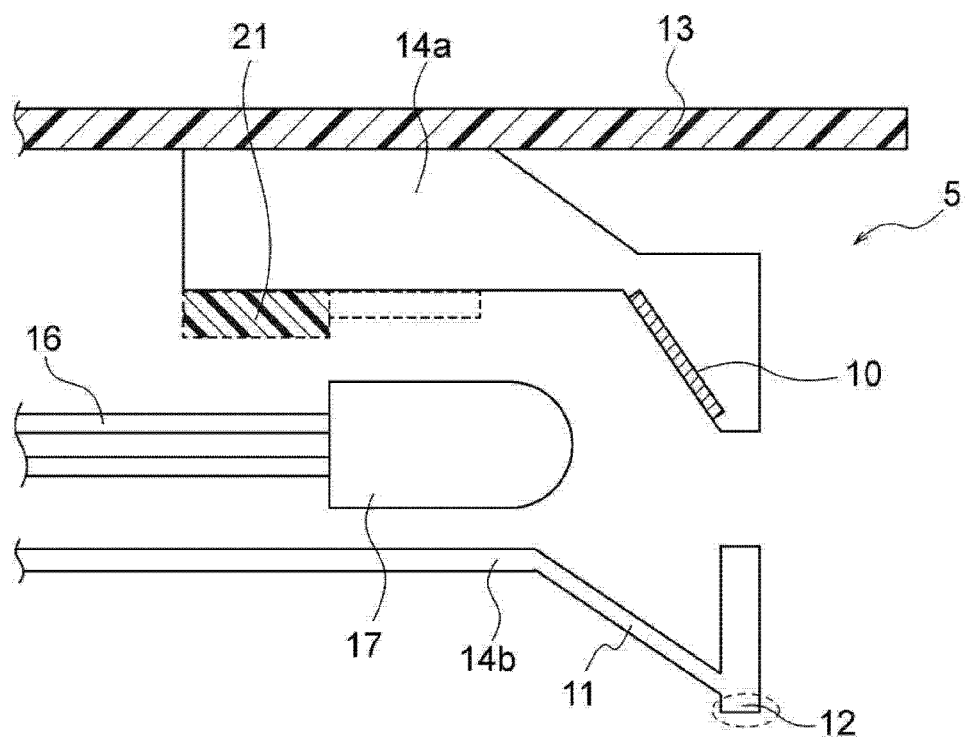
FIG. 7 is a cross-sectional view of an example of the configuration of a part of the optical connector 1 of the second embodiment of the present technology when disassembled.

As illustrated in FIG. 7, the support 14 of the second embodiment of the present technology includes the support 14*a* fixed to the housing 13 and having the reflection plane 10, the support 14*b* having the emission plane 11, and the optical fiber support 21 that fixes and supports the optical fiber 16 or the collimating lens 17. These supports can be manufactured by mold molding, injection molding, or the like of a synthetic resin or the like.

An inclined plane is included inside the support 14*a* on the emission end side, and a mirror plate is attached to or deposited by metal vapor deposition on the inclined plane to provide the reflection plane 10. The emission plane 11 including a transparent member is formed on the emission end side of the support 14*b*, and the emission plane 11 may be applied with AR coating. There is a protrusion protruding with respect to the reflection plane on the emission end side and in the lateral direction of the support 14*b*.

The optical fiber support 21 has a V-groove to which the roundness of the optical fiber 16 or the collimating lens fits.

The optical fiber support 21 is fixed to a light reception end portion of light propagation of the support 14*a* with an adhesive or the like. The optical fiber 16 or the collimating lens 17 is fitted to the V-groove of the optical fiber support 21. Cover the support 14*b* with the support 14*a* so as to hold down the optical fiber or the collimating lens and fix the support 14*b* with an adhesive, screws, or the like. As a result, the optical connector of the second embodiment of the present technology can be manufactured.

Meanwhile, in a case of a modification of the second embodiment, in which the collimating lens is not used, a reflection plane 10, which is obtained by making a mirror surface curved instead of using the collimating lens so that collimated light can be formed, is formed inside the support 14*a* on the emission end side. The modification can be assembled in substantially the same assembly process as in the manufacture of the optical connector of the second embodiment.

Therefore, in a case where the first optical path converting unit is formed inside the support as in the optical connector of the second embodiment of the present technology, there are advantages such as that the number of parts can be reduced, that the cost can be further reduced, that the work can be simplified, or that the number of the work processes can be further reduced.

<Example 1 in the Second Embodiment of the Present Technology>

Figure 8:
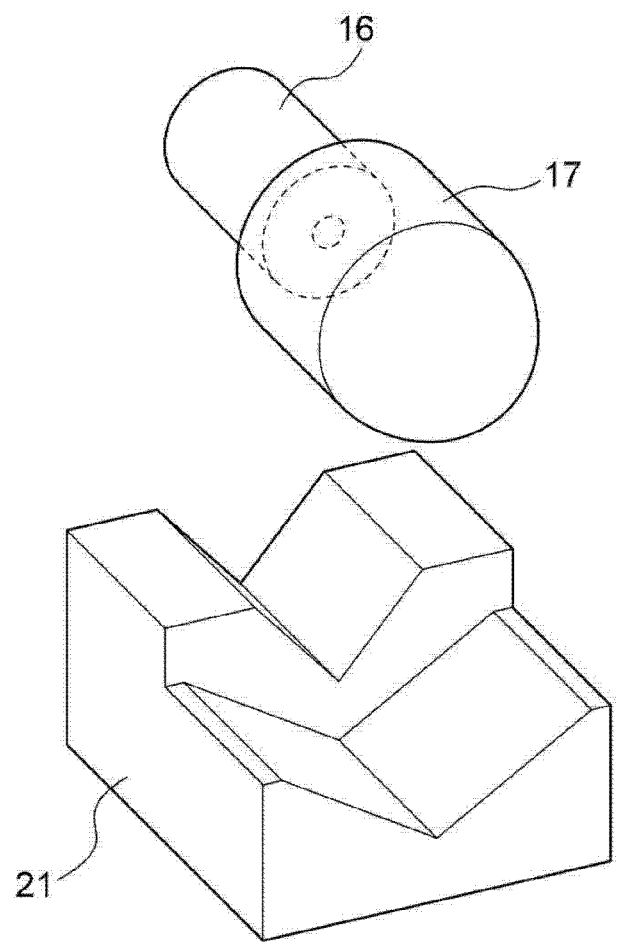
FIG. 8 is a perspective view illustrating the arrangement of components of the optical connector 1 of the second embodiment of the present technology.

In the case of a structure having the V-groove in which the support 14*a* and the reflection plane 10 are integrated as illustrated in FIGS. 6 to 8, the optical fiber 16, the lens 17, and the mirror can be fixed by passive alignment on the basis of the same support as a reference, and thus the alignment process of the respective elements can be simplified. As for the emission plane 11, the emission plane 11 can be sealed by fitting or bonding a separate body. Alternatively, if the mirror surface of the reflection plane 10 is made a curved surface or the transparent material of the emission plane 11 is made a curved surface as illustrated in FIG. 9, the collimating lens can be omitted, and thus all the supports can be integrally molded and manufactured with high position accuracy. The material of the support may be the same transparent member (PC material, etc.) as that of the emission portion. In either case, it is possible to use a general molding method, and thus it is low-cost and is excellent in mass productivity.

As described above, an optical connector of the present technology has high long-term reliability, is applicable to a wide range of use environments, and can be used in various usages. The present technology has an advantage of being less affected by an external impact while leveraging the advantage of the collimated coupling system.

Furthermore, with the present technology, it is possible to implement a countermeasure against laser hazards when the optical connectors are not connected to each other, to improve durability when inserting and removing, to reduce the effects of an impact or foreign matters, and to achieve all of these at the same time. Furthermore, the present technology can also provide a small-sized optical connector having a practical structure. An optical connector of the present technology can have a wider range of optical axis tolerance than conventional optical connectors. Note that the effects described herein are not necessarily limiting, and it suffices to achieve any one of the effects described in the present disclosure.

<1 (5) Optical Connector 1 of Third Embodiment of Present Technology>

Hereinafter, a third embodiment of the present technology will be described in more detail by referring to FIG. 10; however, the present technology is not limited thereto. The description of a configuration overlapping with the configurations of <1 (1)> to <1 (4)> described above will be omitted as appropriate.

An optical connector 1 according to the third embodiment of the present technology includes a first optical path converting unit 5 having one or more reflection planes 10, and the first optical path converting unit 5 emits light in an opposite direction of light propagation. The first optical path converting unit 5 includes a collimated light forming mechanism on the optical path. As the collimated light forming mechanism, it is preferable to use a member capable of forming collimated light. Examples of the member that is capable of forming collimated light include a surface or a reflection plane having a curvature that is capable of transmitting light and a polarizing lens.

Furthermore, the collimated light forming mechanism can be included at an end portion (for example, an emission plane or a propagation plane) of or inside the first optical path converting unit.

Furthermore, the first optical path converting unit, in which the collimated light forming mechanism is used on the optical path, of the third embodiment can be used also in an optical connector 1 of another embodiment by replacing with an optical path converting unit except for the collimating lens 17.

As described above, by using the collimated light forming mechanism in the third embodiment, it is possible to reduce the number of collimating lenses or the number of parts or to further reduce the size.

It is preferable to impart a curvature at an end of the first optical path converting unit of the third embodiment and to form collimated light. For example, as illustrated in FIG. 10, in a case where an optical block is used for the first optical path converting unit, it is preferable to impart a curvature to a propagation plane 19 (FIG. 10A), a reflection plane 10 (FIG. 10B), and an emission plane 11 (FIG. 10C), which are planes of the optical block on the light propagation side.

Meanwhile, in a case of integrated molding with the support of the first optical path converting unit of the second embodiment, the reflection plane and the emission plane may have a curvature as described above. Alternatively, a polarizing filter (green lens) or a collimated light forming lens whose material or curvature is adjusted may be included on the optical path (for example, a propagation plane or an emission plane).

Furthermore, in a case where an optical block is used for the optical path converting unit, it is conceivable to prepare the propagation plane or the emission plane for the formation of collimated light. In addition, in a case where multiple optical blocks are combined to form an optical converting unit, a collimated light forming lens or a polarizing lens may be disposed in the optical converting unit.

The optical connector 1 of the third embodiment, preferably, further includes a housing 13 capable of storing respective parts of the first optical path converting unit and other components, a light shield (not illustrated), an optical fiber 16, a collimated light forming mechanism, or an optical path forming unit. It is also preferable that the optical path forming unit including the optical fiber 16, a collimating lens 17, and the like is included inside the first optical path converting unit 5 of the second embodiment. Moreover, although the first optical path converting unit 5 of the second embodiment is integrated with the support, the support 14 may be separately provided for position adjustment for the housing 13 or formation of the optical path.

<Example 1 in Third Embodiment of Present Technology>

Figure 10:
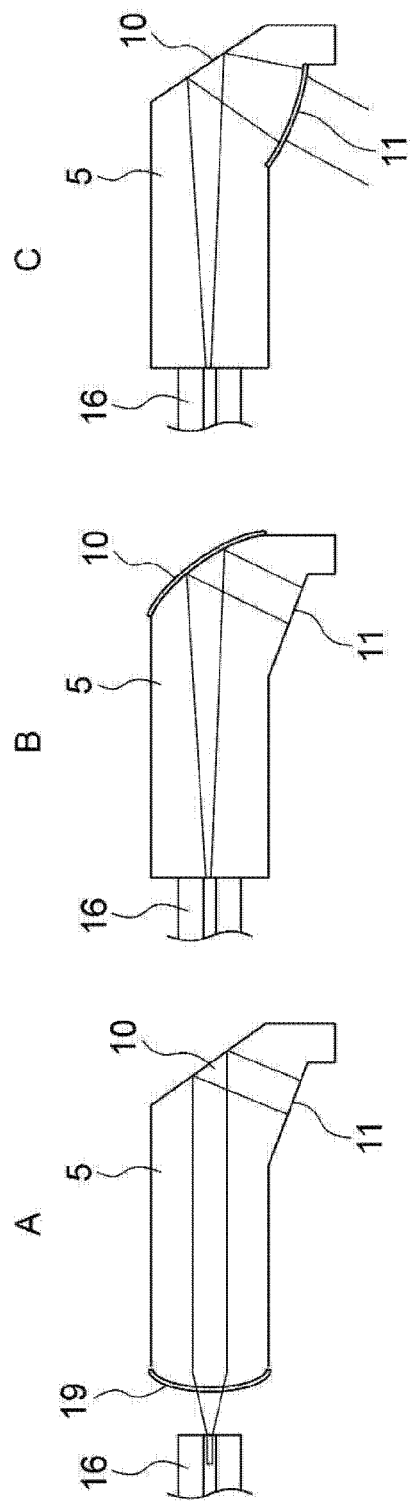
FIG. 10 is a diagram illustrating modifications of a first optical path conversion block used for an optical connector 1 of a third embodiment of the present technology.

As illustrated in FIG. 10, the collimating lens may be omitted by imparting a curvature on any end face of the optical block. A curvature is imparted on the incident plane side in FIG. 10A, on the reflection plane in FIG. 10B, and on the emission plane in FIG. 10C. In every case, the curved surface produces similar effects to those of a lens. The number of parts can be reduced, thereby leading to cost reduction.

As described above, an optical connector of the present technology has high long-term reliability, is applicable to a wide range of use environments, and can be used in various usages. The present technology has an advantage of being less affected by an external impact while leveraging the advantage of the collimated coupling system.

Furthermore, with the present technology, it is possible to implement a countermeasure against laser hazards when the optical connectors are not connected to each other, to improve durability when inserting and removing, to reduce the effects of an impact or foreign matters, and to achieve all of these at the same time. Furthermore, the present technology can also provide a small-sized optical connector having a practical structure. An optical connector of the present technology can have a wider range of optical axis tolerance than conventional optical connectors. Note that the effects described herein are not necessarily limiting, and it suffices to achieve any one of the effects described in the present disclosure.

<1 (6) Optical Connector 1 of Fourth Embodiment of Present Technology>

Hereinafter, a fourth embodiment of the present technology will be described in more detail by referring to FIGS. 11 and 12; however, the present technology is not limited thereto. The description of a configuration overlapping with the configurations of <1 (1)> to <1 (5)> described above will be omitted as appropriate.

An optical connector 1 according to the fourth embodiment of the present technology includes a first optical path converting unit 5 having one or more reflection planes 10, and the first optical path converting unit 5 emits light in an opposite direction of light propagation. It is possible to further include a partition unit 30 in the lateral direction on the emission end side of the first optical path converting unit, and the partition unit 30 can partition the first optical path converting unit from the outside. It is preferable that the partition unit includes a partition 31 under the protrusion of the first optical path converting unit. It is preferable that the partition unit 30 further includes an energizing unit 32 that energizes the partition 31 in a direction in which the partition 31 projects outward. Preferable is a mechanism in which the energizing is performed by an elastic body such as a spring or rubber. The partition unit 30 is configured to be movable when optical connectors are connected to each other and a housing of the other optical connector abuts against the partition unit 30. By being movable inward by the abutment, the partition unit 30 is configured so that a region of a Z-shaped optical path is formed by the optical connector and the other optical connector after the partition moves inward.

The shape of the partition 31 is not particularly limited, and a quadrangular shape or the like is preferable. Moreover, it is desirable to use the above-mentioned synthetic resin as the material of the partition 31. Furthermore, a similar material to that used for the light shields described above can be used.

The other optical connector is inserted under the emission end side of the optical connector; however, this part is usually a dead space, and due to this dead space, the emission plane is easily damaged by foreign matters from the outside, or foreign matters easily accumulate. The partition unit 30 of the present technology can reduce the influence of foreign matters entering from the outside and can effectively utilize the dead space that is created.

It is preferable that the partition unit 30 of the present technology is included in a space inside the housing 13, and more preferably, in the region of the dead space on the emission end side. The mechanism of the partition unit 30 is not particularly limited; however, for example, a simple mechanism mainly including an elastic body such as a spring and a molded member may be included to further prevent foreign matters from entering. When the optical connectors are not connected, the partition unit 30 is pushed up to the emission plane side by the energizing force. When the optical connectors are connected, the partition unit 30 is pushed down by the exterior or internal parts such as the optical block and thereby used. It is possible to adopt a simple mechanism, and failures are not likely to occur, and even if the energizing body does not work, the optical connector function is not affected.

The optical connector 1 of the fourth embodiment, preferably, further includes a housing 13 capable of storing respective parts of the first optical path converting unit and other components, light shields 15, an optical fiber 16, a collimated light forming mechanism, or an optical path forming unit. The optical path forming unit includes the optical fiber 16, the collimating lens 17, and the like.

Furthermore, the partition unit 30 used in the fourth embodiment may be used in an optical connector of another embodiment.

<Example 1 in Fourth Embodiment of Present Technology>

Figure 11:
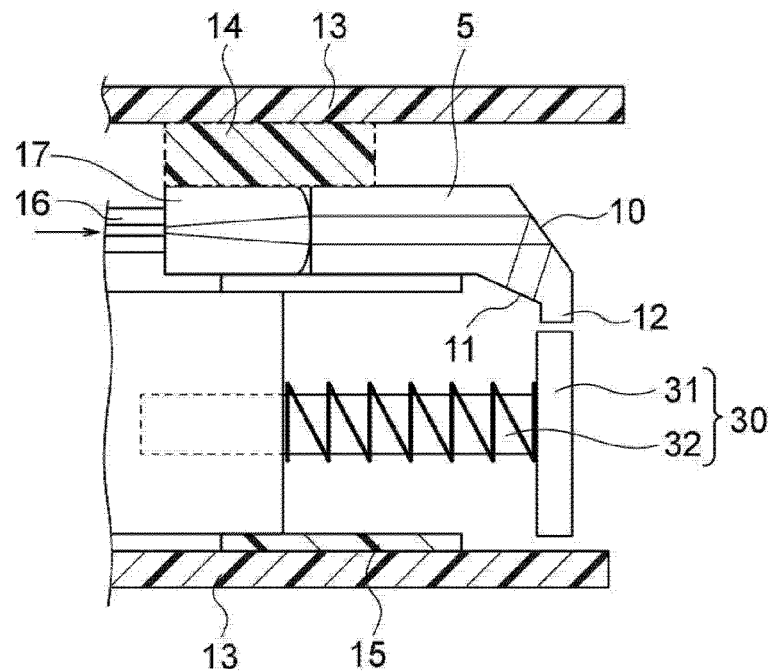
FIG. 11 is a cross-sectional view illustrating an example of the configuration of an optical connector 1 (when disconnected) of a fourth embodiment of the present technology.
Figure 12:
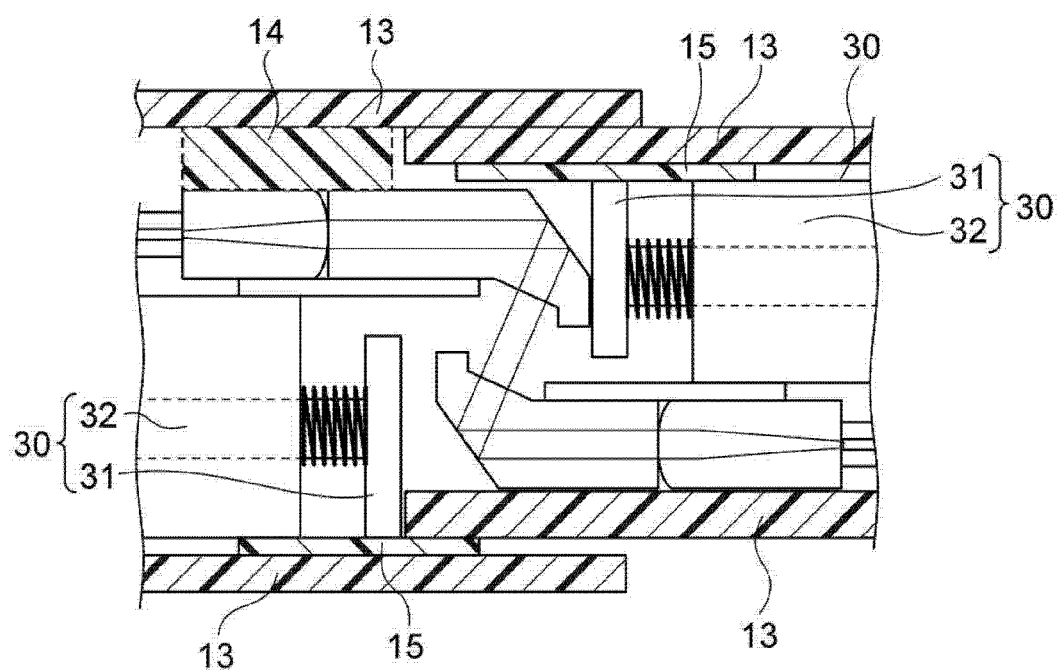
FIG. 12 is a cross-sectional view illustrating an example of the configuration of the optical connector 1 (when connected) of the fourth embodiment of the present technology.

A mechanism 30 of a simple partition unit mainly including a spring (energizing unit) 32 and a molded member (partition) 31, like a push button illustrated in FIG. 11 may be included in the dead space under the emission plane side to allow this mechanism 30 of the partition unit to further prevent foreign matters from entering. When optical connectors are not connected, the molded member 31 of a flat plate shape is pushed up to the emission plane side by the force of the spring. As illustrated in FIG. 12, when the optical connectors are connected, the molded member 31 of a flat plate shaped can be used by being pushed down by an exterior or an internal part such as an optical block of the other optical connector. Due to a simple mechanism, failures are not likely to occur, and even if the spring does not work, the connector function is not affected.

As described above, an optical connector of the present technology has high long-term reliability, is applicable to a wide range of use environments, and can be used in various usages. The present technology has an advantage of being less affected by an external impact while leveraging the advantage of the collimated coupling system.

Furthermore, with the present technology, it is possible to implement a countermeasure against laser hazards when the optical connectors are not connected to each other, to improve durability when inserting and removing, to reduce the effects of an impact or foreign matters, and to achieve all of these at the same time. Furthermore, the present technology can also provide a small-sized optical connector having a practical structure. An optical connector of the present technology can have a wider range of optical axis tolerance than conventional optical connectors. Note that the effects described herein are not necessarily limiting, and it suffices to achieve any one of the effects described in the present disclosure.

<1 (7) Optical Connector 1 of Fifth Embodiment of Present Technology>

Figure 13:
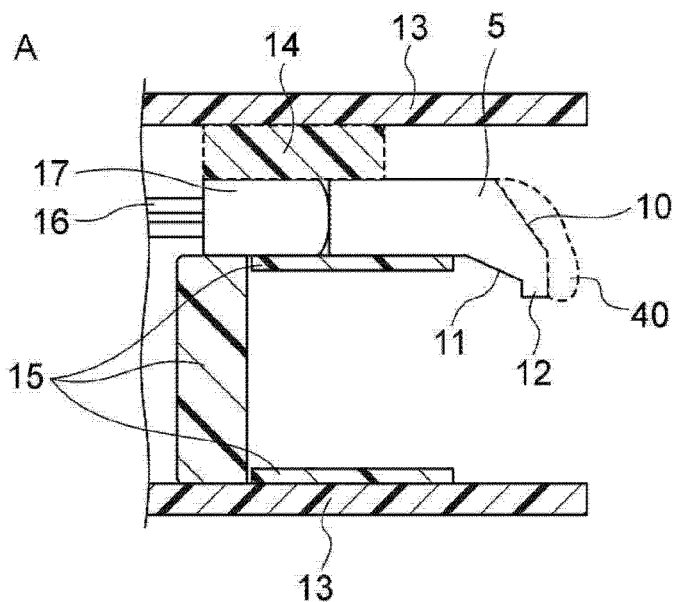
FIG. 13 is a cross-sectional view illustrating an example of the configuration of an optical connector 1 (when disconnected) of a fifth embodiment of the present technology.
Figure 13:
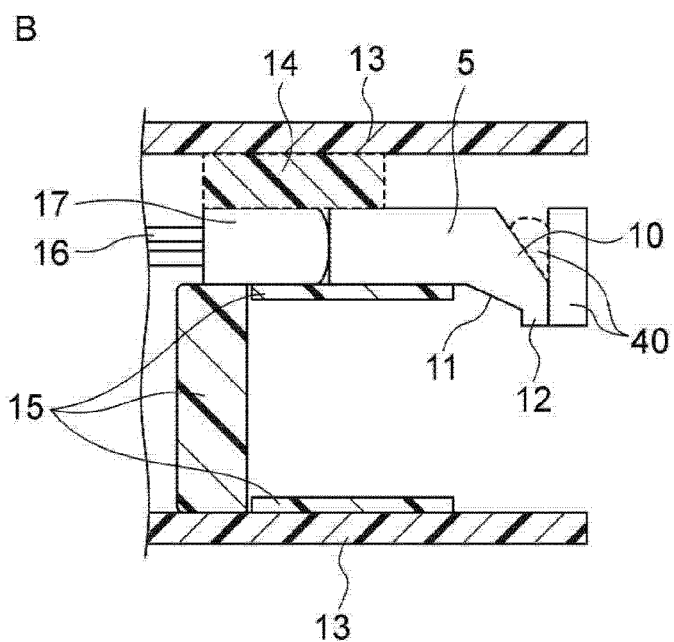

Hereinafter, a fifth embodiment of the present technology will be described in more detail by referring to FIG. 13; however, the present technology is not limited thereto. The description of a configuration overlapping with the configurations of <1 (1)> to <1 (6)> described above will be omitted as appropriate.

An optical connector 1 according to the fifth embodiment of the present technology includes a first optical path converting unit 5 having one or more reflection planes 10, and the first optical path converting unit 5 emits light in an opposite direction of light propagation. The first optical path converting unit further includes a protection unit 40 on an emission end side thereof.

Furthermore, as an emission plane 11, an inclined plane capable of emitting light from the reflection plane to an incident plane of the other optical path converting unit is included. It is preferable that the protection unit 40 such as protective coating or installation of a protective member for reduction of an external impact is provided on the emission plane 11 or in the vicinity thereof (for example, on the emission end side). Furthermore, as the protection unit 40, coating for reduction of an external impact may be applied on the entire surface of a prism. Examples of the coating for mitigating an external impact include photocurable resin (visible-light-curable or ultraviolet-curable) coating. Furthermore, examples of a protective member used for the protection unit 40 include a photocurable resin member and an elastic part such as rubber.

By providing the protection unit on the outside of the reflection plane 10 of the optical block, the reflection plane can be protected from an external impact, and thus the transmission quality can be maintained. As a protection method, a photocurable resin (for example, visible light curable resin or ultraviolet curable resin) or the like may be applied on the reflection plane, or a plastic or metal plate may be bonded to an end portion of the emission portion.

It is preferable that the optical connector 1 of the fifth embodiment further includes a housing 13 capable of storing each part such as the first optical path converting unit, a light shield 15, an optical fiber 16, a collimated light forming mechanism, or an optical path forming unit. The optical path forming unit includes the optical fiber 16, the collimating lens 17, and the like.

Furthermore, the protection unit 40 used in the fifth embodiment may be used in an optical connector of another embodiment.

<Example 1 in Fifth Embodiment of Present Technology>

By providing the protection unit 40 on the outside of the reflection plane 10 of the optical block 5, the reflection plane 10 can be protected from an external impact, and thus the transmission quality can be maintained. As a protection method, as illustrated in FIG. 13, a UV-curable resin or the like may be directly applied to the reflection plane 10 and cured thereon, or a synthetic resin such as plastic or a metal plate may be bonded.

As described above, an optical connector of the present technology has high long-term reliability, is applicable to a wide range of use environments, and can be used in various usages. The present technology has an advantage of being less affected by an external impact while leveraging the advantage of the collimated coupling system.

Furthermore, with the present technology, it is possible to implement a countermeasure against laser hazards when the optical connectors are not connected to each other, to improve durability when inserting and removing, to reduce the effects of an impact or foreign matters, and to achieve all of these at the same time. Furthermore, the present technology can also provide a small-sized optical connector having a practical structure. An optical connector of the present technology can have a wider range of optical axis tolerance than conventional optical connectors. Note that the effects described herein are not necessarily limiting, and it suffices to achieve any one of the effects described in the present disclosure.

<1 (8) Optical Connector 1 of Sixth Embodiment of Present Technology>

Hereinafter, a sixth embodiment of the present technology will be described in more detail by referring to FIGS. 14 and 15; however, the present technology is not limited thereto. The description of a configuration overlapping with the configurations of <1 (1)> to <1 (7)> described above will be omitted as appropriate.

An optical connector 1 according to the sixth embodiment of the present technology includes a first optical path converting unit 5 having one or more reflection planes 10, and the first optical path converting unit 5 emits light in an opposite direction of light propagation.

The optical connector 1 of the sixth embodiment of the present technology has a plurality of the first optical path converting units 5, and these first optical path converting units are, preferably, arranged so as to be symmetrical with respect to the light propagation.

Figure 14:
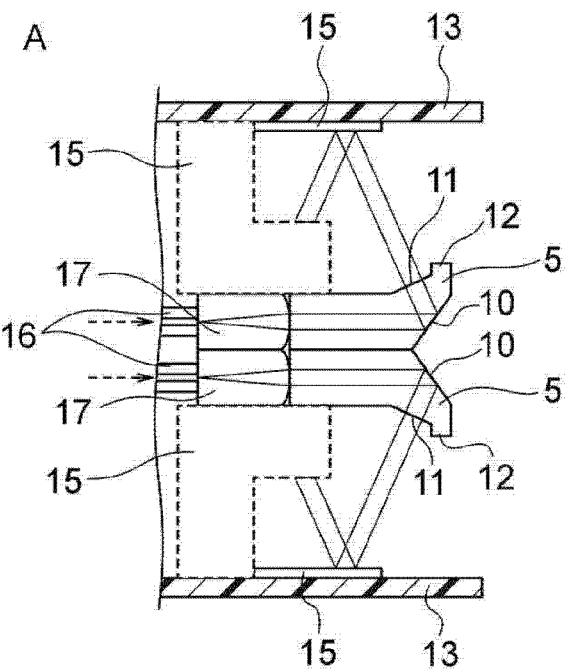
FIG. 14 is a cross-sectional view illustrating an example of the configuration of an optical connector 1 (when disconnected) of a sixth embodiment of the present technology.
Figure 14:
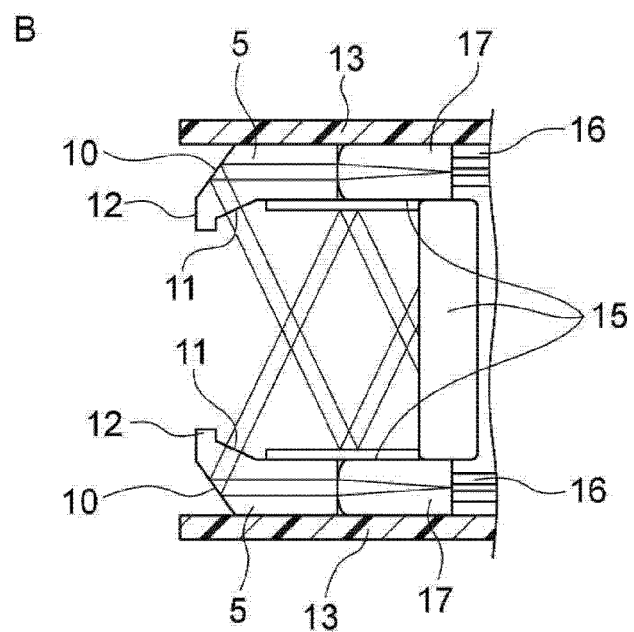

An example of the optical connector 1 of the sixth embodiment is illustrated in FIG. 14; however, the present invention is not limited thereto. As illustrated in FIG. 14A, the optical connector 1 has first optical path converting units 5 and 5 arranged so that the two optical path converting units 5 are symmetrical with respect to light propagation. In this case, emission planes 11 and 11 of the first optical path converting units 5 and 5 are arranged symmetrically to each other and back to back. In another optical connector 1, optical path converting units 5 and 5 are arranged so that the first optical path converting units 5 and 5 can each form a Z-shaped optical path when the optical connectors are connected. As illustrated in FIG. 15, in the optical connectors 1 and 1 when connected, the first optical path converting units 5 and 5 of the optical connector are arranged near the center in the Z-axis direction, and second optical path converting units 5 and of the other optical connector are arranged on both sides in the Z-axis direction, therefore, light is propagated from the light transmission side to the light reception side, and each optical path in this case forms a Z-shaped optical path.

Figure 15:
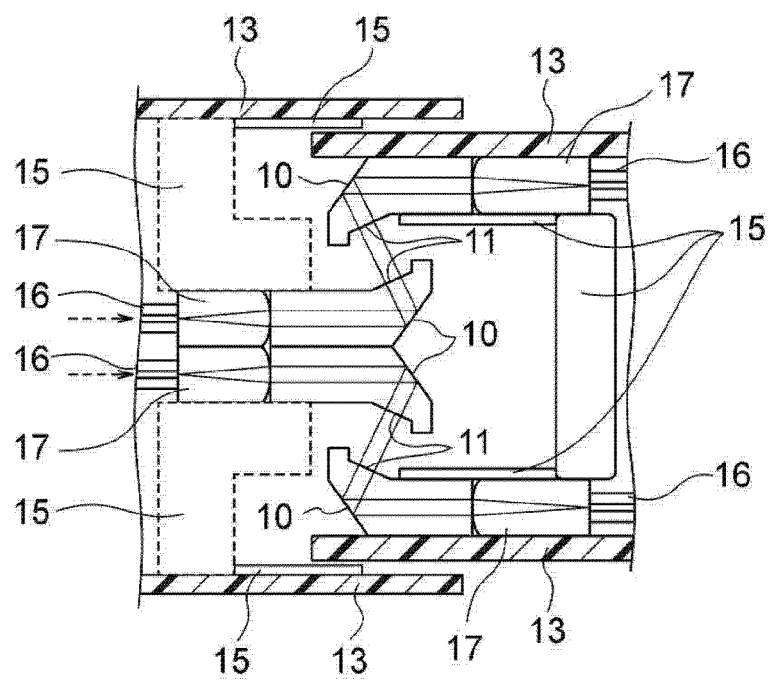
FIG. 15 is a cross-sectional view illustrating an example of the configuration of the optical connector 1 (when connected) of the sixth embodiment of the present technology.

As illustrated in FIG. 15, a reversible structure can be obtained by making the shape symmetrical with respect to the light propagation direction. Since it is not necessary to check the direction when inserting and removing, damages to the optical connector due to incorrect insertion can be prevented, and improved workability can be expected.

It is preferable that the optical connector 1 of the sixth embodiment further includes a housing 13 capable of storing each part such as the first optical path converting unit, a light shield 15, an optical fiber 16, a collimated light forming mechanism, or an optical path forming unit. The optical path forming unit includes the optical fiber 16, the collimating lens 17, and the like. Furthermore, in the optical connector 1 of the sixth embodiment, a part, a shape, or a mechanism used in an optical connector of another embodiment may be used.

<Example 1 in Sixth Embodiment of Present Technology>

A reversible structure can be obtained by making the structure of the first optical path converting unit or the like of the present technology symmetrical with respect to the propagation direction as illustrated in FIGS. 14 and 15. Since it is not necessary to check the direction when inserting and removing, damages due to incorrect insertion can be prevented, and improved workability can be expected.

As described above, an optical connector of the present technology has high long-term reliability, is applicable to a wide range of use environments, and can be used in various usages. The present technology has an advantage of being less affected by an external impact while leveraging the advantage of the collimated coupling system.

Furthermore, with the present technology, it is possible to implement a countermeasure against laser hazards when the optical connectors are not connected to each other, to improve durability when inserting and removing, to reduce the effects of an impact or foreign matters, and to achieve all of these at the same time. Furthermore, the present technology can also provide a small-sized optical connector having a practical structure. An optical connector of the present technology can have a wider range of optical axis tolerance than conventional optical connectors. Note that the effects described herein are not necessarily limiting, and it suffices to achieve any one of the effects described in the present disclosure.

<1 (9) Optical Connector 1 of Seventh Embodiment of Present Technology>

Hereinafter, a seventh embodiment of the present technology will be described in more detail by referring to FIG. 16; however, the present technology is not limited thereto. The description of a configuration overlapping with the configurations of <1 (1)> to <1 (8)> described above will be omitted as appropriate.

An optical connector 1 according to the seventh embodiment of the present technology includes a first optical path converting unit 5 having one or more reflection planes 10, and the first optical path converting unit 5 emits light in an opposite direction of light propagation.

Figure 16:
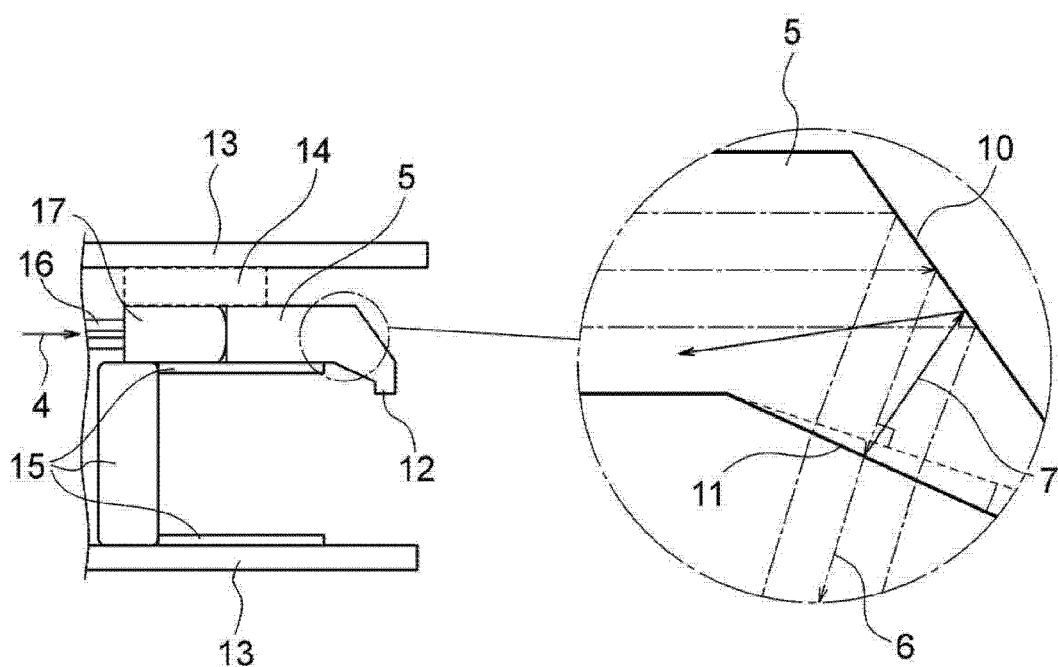
FIG. 16 is a cross-sectional view illustrating an example of the configuration of an optical connector 1 (when disconnected) of a seventh embodiment of the present technology.

An example of the first optical path converting unit 5 used in the optical connector 1 of the seventh embodiment is illustrated in FIG. 16; however, the present invention is not limited thereto. The optical connector 1 of the seventh embodiment of the present technology has the first optical path converting unit 5 whose emission plane 11 is inclined so as not to be perpendicular to the optical path from the reflection plane 10. As a result, return light can be reduced. In addition, the output can be stabilized, and noise can be reduced. There is an advantage that it is not necessary to use other optical parts such as an isolator.

It is preferable that the optical connector 1 of the seventh embodiment further includes a housing 13 capable of storing each part such as the first optical path converting unit, a light shield 15, an optical fiber 16, a collimated light forming mechanism, or an optical path forming unit. The optical path forming unit includes the optical fiber 16, the collimating lens 17, and the like. Furthermore, the first optical path converting unit 5 used in the seventh embodiment may be used in an optical connector of another embodiment, or a positional relationship between a reflection plane and an emission plane of a first optical path converting unit used in another embodiment may be adjusted so as to have the positional relationship between the reflection plane and the emission plane of the first optical path converting unit 5 of the seventh embodiment.

<Example 1 in Seventh Embodiment of Present Technology>

By making the emission plane 11 inclined as illustrated in FIG. 16, the influence of return light due to Fresnel reflection can be easily reduced. The angle is determined by the distance from an end face of the optical fiber to the emission plane; however, basically the structure of the present technology is sufficiently long with respect to the core diameter of the optical fiber, and thus an angle of several degrees (1° to 5°) is sufficient for the prevention. At this point, the emission light is also slightly refracted; however, there is no influence in the structure of the present technology. It is more reasonable than AR coating and does not peel off.

As described above, an optical connector of the present technology has high long-term reliability, is applicable to a wide range of use environments, and can be used in various usages. The present technology has an advantage of being less affected by an external impact while leveraging the advantage of the collimated coupling system.

Furthermore, with the present technology, it is possible to implement a countermeasure against laser hazards when the optical connectors are not connected to each other, to improve durability when inserting and removing, to reduce the effects of an impact or foreign matters, and to achieve all of these at the same time. Furthermore, the present technology can also provide a small-sized optical connector having a practical structure. An optical connector of the present technology can have a wider range of optical axis tolerance than conventional optical connectors. Note that the effects described herein are not necessarily limiting, and it suffices to achieve any one of the effects described in the present disclosure.

<1 (10) Optical Connector 1 of Eighth Embodiment of Present Technology>

Hereinafter, an eighth embodiment of the present technology will be described in more detail by referring to FIGS. 17 to 20; however, the present technology is not limited thereto. The description of a configuration overlapping with the configuration of <1 (1)> to <1 (9)> described above will be omitted as appropriate.

An optical connector 1 according to the eighth embodiment of the present technology includes a first optical path converting unit 5 having one or more reflection planes 10, and the first optical path converting unit 5 emits light in an opposite direction of light propagation.

The optical connector of the eighth embodiment further includes an optical axis tolerance adjusting mechanism in an optical fiber. The optical axis tolerance adjusting mechanism enables adjustment of the tolerance of the optical axis in the optical fiber, thereby allowing the range of the tolerance to be expanded. Furthermore, the optical axis tolerance adjusting mechanism includes, for example, an optical path extension mechanism that extends the optical path by using a plurality of reflection planes. It is preferable that the optical path extension mechanism is disposed preceding to a point where light arrives at the emission plane of the first optical path converting unit.

It is preferable that the optical connector 1 of the eighth embodiment further includes a housing 13 capable of storing each part such as the first optical path converting unit, a light shield 15, an optical fiber 16, a collimated light forming mechanism, or an optical path forming unit. The optical path forming unit includes the optical fiber 16, the collimating lens 17, and the like. Furthermore, the optical axis tolerance adjusting mechanism used in the eighth embodiment may be used in an optical connector of another embodiment.

Figure 17:
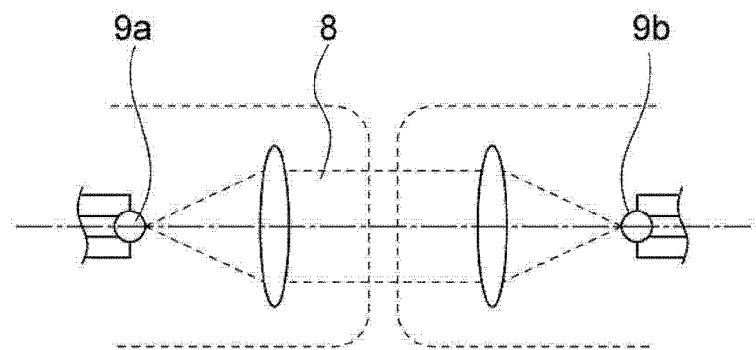
FIG. 17 is a conceptual diagram of optical connectors 1 and 1 at the time of coupling of the present technology according to an eighth embodiment of the present technology.
Figure 17:
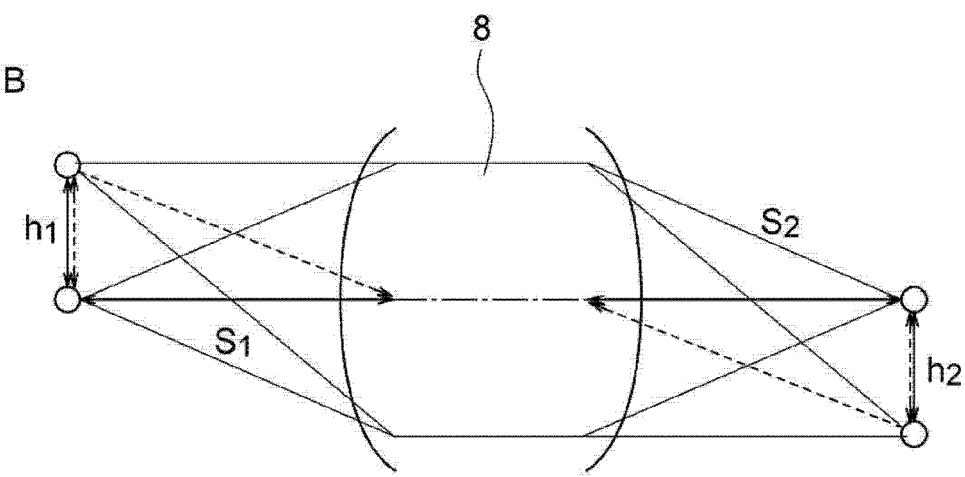
Figure 17:
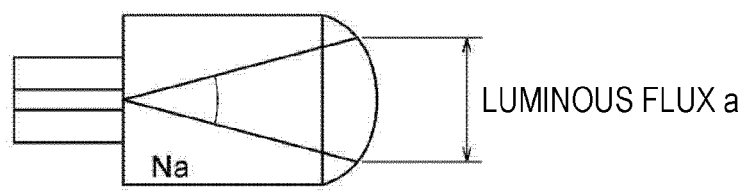
Figure 18:
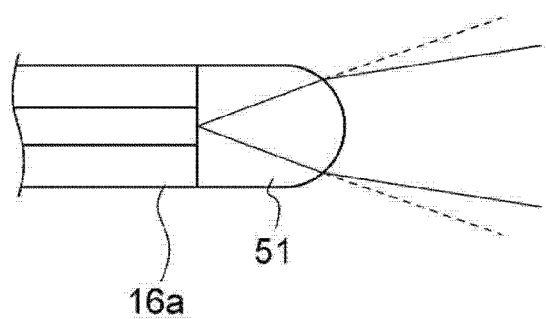
FIG. 18 is a diagram illustrating a modification of an optical fiber and a member having light distribution characteristics used for the optical connector 1 of the eighth embodiment of the present technology.
Figure 18:
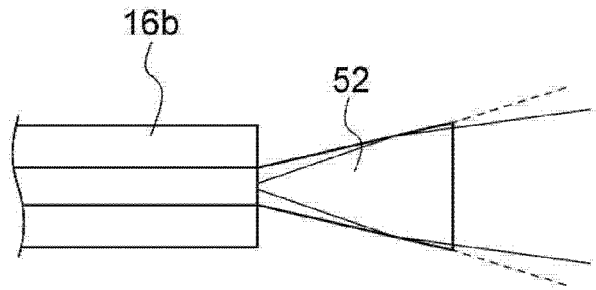
Figure 20:
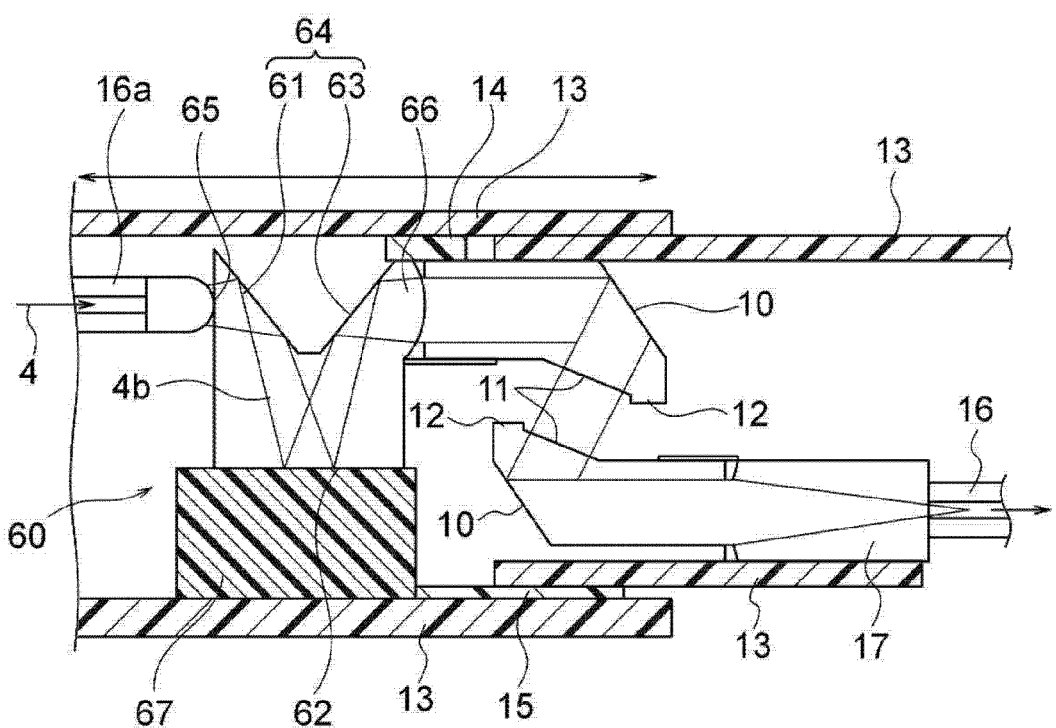
FIG. 20 is a cross-sectional view illustrating a modification of the configuration of the optical connector 1 (when disconnected) of the eighth embodiment of the present technology.

By using the optical axis tolerance adjusting mechanism of the present technology, it is possible to provide a structure capable of increasing the optical axis tolerance between the optical fiber on the light transmission side and the collimating lens (for example, FIGS. 17, 18, and 20).

In an optical system of the collimated coupling system, the relationship between the light transmission position and the spot position on the light reception side can be regarded as one thick lens as illustrated in FIG. 17, and thus a light transmission position shift (h1) and the amount of shift (h2) of the spot position on the light reception side are equivalent to the relationship of the official lateral magnification of the lens, and the ratio of the light transmission position shift (h1) to the amount of shift (h2) of the spot position on the light reception side is equal to the ratio of the distance from the lens principal plane on the light transmission side to the emission position (S1) to the distance from the lens principal plane on the light reception side to the spot position (S2). In order to increase the tolerance, it is only required to reduce the ratio of the light transmission position shift (h1) to the amount of shift (h2) of the spot position on the light reception side, and thus, from the above-described relationship, it is conceivable to increase the distance (S1) from the lens principal plane on the light transmission side to the emission position or to reduce the distance from the lens principal plane on the light reception side to the spot position (S2). Specifically, the length of the collimating lens on the light transmission side is extended, or the length of the collimating lens on the light reception side is reduced.

First, let us consider the case of extending the length of the collimating lens on the light transmission side, the length of the collimating lens is determined by the NA of the optical fiber and the luminous flux width a as expressed by an equation of $\min\_S=(a/2)/\tan(\theta/2)$ (s denotes the length of the collimated light forming lens, luminous flux a, angle θ), and thus simply extending the length results in a loss due to vignetting. Therefore, in order to extend the length without vignetting, it is necessary to narrow the light distribution of the emission light from the optical fiber. As a method of narrowing the light distribution of the emission light by the optical fiber, it is conceivable to use an optical fiber attached with a lens that has a curvature at an end face of the optical fiber. The light distribution characteristics of the emission light from the optical fiber can be narrowed by the action of the curved surface of the core end face.

An optical fiber attached with a lens having a curvature that can be used in the present technology can be manufactured by a known method such as polishing or melting (for example, Japanese Patent Application Laid-Open No. 1996-054538). Alternatively, in the present technology, it is also possible to use a funnel shape that spreads on the core end face of the optical fiber. The funnel inclined plane can have the effect of narrowing the light distribution (see, for example, FIG. 18). Optical fibers with a funnel have been reported, for example, by Microlens Tenshahou Niyoru Routo-Gata Jikokeiseikou Rod at Students' Workshop in 2007 of the Tokyo Branch of the Institute of Electronics, Information and Communication Engineers.

Figure 19:
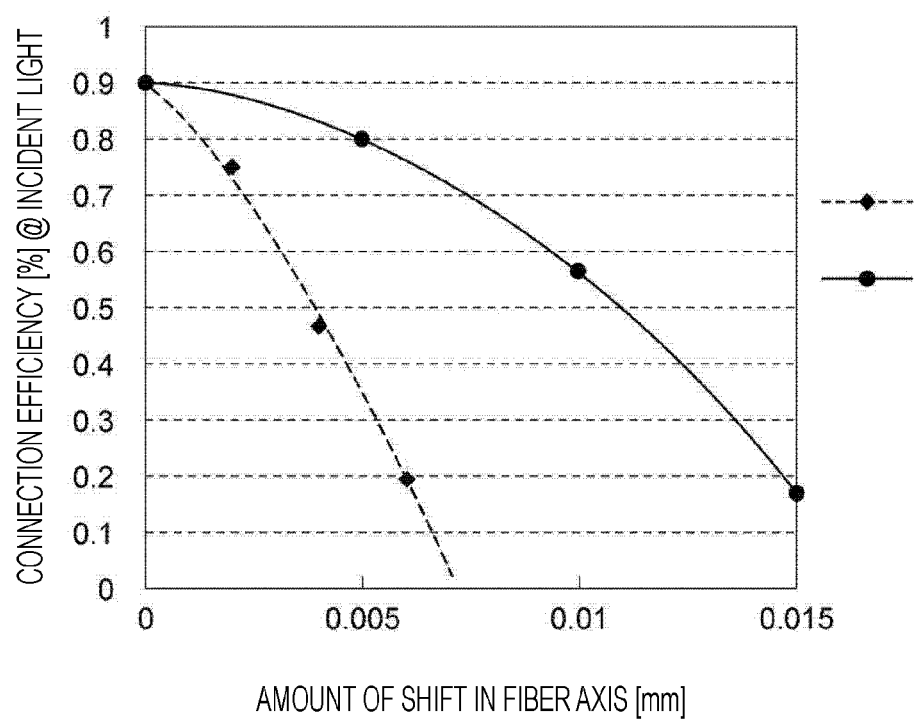
FIG. 19 is a graph illustrating the relationship between the connection efficiency (%) @ incident light and the amount of shift in the optical fiber axis (mm) on a light transmission side in the eighth embodiment of the present technology.

In order to confirm whether or not the expected effects of the present technology can be obtained by an optical fiber attached with a lens having a curvature in the present technology, calculation results of a simulation using a ray tracing method is illustrated in FIG. 19. Note that FIG. 19 is a graph illustrating the relationship between the connection efficiency (%) @ incident light and the amount of shift in the optical fiber axis (mm) on a light transmission side. A diamond in FIG. 19 represents the above-mentioned collimated coupling system in which a collimating lens of a length of about 0.9 mm is included at the tip of an optical fiber (NA 0.15, core diameter Φ8 μm) on each of a light transmission side and a light reception side, and, a dot • in FIG. 19 represents a structure in which the optical fiber on the light transmission side of ♦ is replaced with an optical fiber attached with a lens, and thereby the length of an optical fiber collimating lens is approximately tripled, whereas the light reception side has the same structure as ♦.

A comparison is made between the structure of the collimated coupling system, in which conventional optical fibers and collimating lenses are used, and the structure in which the length of the collimating lens on the light transmission side is intentionally approximately tripled by narrowing the light distribution characteristics by using the fiber attached with a lens having a curvature only on the light transmission side. It can be understood that the latter of the fiber attached with the lens has a smaller reduction rate of the connection efficiency with respect to the axial shift of the optical fiber on the light transmission side. However, if this shape is applied to the present structure, the axial shift tolerance of the optical fiber becomes large; however, the connector size becomes large in trade-off.

<Example 1 in Eighth Embodiment of Present Technology>

Therefore, the present inventors have devised the idea of further using the dead space in the structure of the present technology and has achieved a structure in which an optical path is further bent to allow the connector size to be smaller, and the concept of this structure is illustrated in FIG. 20 as an example 1 of the eighth embodiment of the present technology.

As illustrated in FIG. 20, by making a part of the collimating lens recessed to cause folding back, it is possible to increase the positional shift tolerance of an optical fiber on a light transmission side without increasing the size of an optical connector. A mirror may be used for the recessed surface, or the mirror may be omitted in a case where total reflection conditions are satisfied.

Similarly, in order to reduce the length of the collimating lens on the light reception side, making the width of a luminous flux a smaller from the above equation min_S can result in reduction in the length of the collimating lens. In a case of the collimated coupling system, the influence of foreign matters is reduced by increasing the width of the luminous flux a, therefore, a disadvantage of influences of foreign matters occurs in a general collimated coupling system. However, since the present technology adopts a structure in which foreign matters do not easily adhere, the luminous flux a can be made smaller than that in a general collimated coupling system, and thus the length of the collimating lens on the light reception side can be reduced.

<Optical Axis Tolerance Adjusting Mechanism and Optical Path Extension Mechanism>

That is, it is preferable that, in the present technology, an optical connector of the present technology further includes an optical axis tolerance adjusting mechanism for an optical fiber.

The optical axis tolerance adjusting mechanism is configured so that the range of the optical axis tolerance between an optical fiber and a collimating lens on the light transmission side is large.

Moreover, the optical axis tolerance adjusting mechanism is configured to narrow the light distribution of emission light from the optical fiber. Furthermore, as illustrated in FIG. 18, it is preferable to dispose a light diffusing lens 51 (for example, a curved-type diffusing lens 51a or a funnel-type diffusing lens 51b) at a tip of an optical fiber 16.

Furthermore, the optical axis tolerance adjusting mechanism is configured to increase the length of a collimating lens on a light transmission side or to reduce the length of a collimating lens on a light reception side.

It is further preferable that, as illustrated in FIG. 20, the optical axis tolerance adjusting mechanism is an optical path extension mechanism 60 having a plurality of reflection planes. By the optical path extension mechanism that extends the optical path, the range of the optical axis tolerance in the optical fiber can be expanded, and it is possible to use a miniaturized mechanism that adjusts the optical axis tolerance. It is preferable that the optical path extension mechanism 60 is disposed preceding to a point where light arrives at the emission plane 11 of the first optical path converting unit.

It is preferable that the optical path extension mechanism 60 has a plurality of reflection planes (for example, extension reflection planes 61, 62, and 63 in FIG. 20) and that these reflection planes are configured to bend the optical path from the light propagation direction 4 a plurality of times to extend the optical path.

The optical path extension mechanism 60 is configured to reflect light from the optical fiber 16 on the plurality of reflection planes and to emit light to the first optical path converting unit 5.

The optical path extension mechanism 60 is, preferably, disposed in the space inside the housing 13. Since there is a space (dead space) in the housing 13 when the optical connectors 1 and 1 are connected, it is more preferable to dispose the optical path extension mechanism 60 in this dead space.

The optical path extension mechanism 60 preferably has a collimated light forming mechanism for emission to the first optical path converting unit 5. Alternatively, it is preferable that the light incident on an incident plane 65 of the optical path extension mechanism 60 is diffused light or collimated light. For formation of the diffused light or the collimated light, for example, the optical fiber 16a having a light diffusing lens may be used, or a combination of the collimating lens 17 and the optical fiber 16 may be used.

It is preferable that the optical path extension mechanism 60 is disposed preceding to a point where light arrives at the first optical path converting unit 5. In the optical path extension mechanism 60, the diffused light incident from the incident plane 65 is reflected by the extension reflection planes 61, 62, 63, . . . , and thus the length of an optical path 4b becomes longer. The optical path 4b whose length is extended in this manner propagates the light from an emission plane 66 to a propagation plane of the first optical path converting unit 5, and connection with another optical connector forms a Z-shaped optical path.

In the optical path extension mechanism 60, it is preferable that the extension reflection planes are arranged so that the optical path length becomes longer and that the plurality of reflection planes reflects each other.

The optical path extension mechanism 60, preferably, includes a V-shaped reflection portion 64 having the extension reflection plane 61 and the extension reflection plane 63. The V-shaped reflection portion 64, preferably, has the extension reflection plane 61 that reflects the incident light and emits the incident light to the extension reflection plane 62 and the extension reflection plane 63 that emits the light emitted from the extension reflection plane 62 to the first optical path converting unit. It is further preferable that the optical path extension mechanism 60 has the reflection portion 62 that reflects the emitted light from the V-shaped reflection portion 64 and emits the reflected light to the V-shaped reflection portion 64.

An extension support 67, which enables adjustment of the arrangement position and the height, may be disposed in the optical path extension mechanism 60 as appropriate. Furthermore, the V-shaped reflection portion 64 and the reflection portion 62 are preferably supported by the extension support 67. It is further preferable that the extension support 67 includes the incident plane 65 from which incident light enters and the emission plane 66 for propagating light to the first optical path converting unit 5. For the incident plane 65 and the emission plane 66, a transparent member having light transmission property can be used. The extension support 67 can be fixed to the inner wall of the housing 13, which allows the optical path extension mechanism 60 to be fixed to the optical connector 1.

According to the eighth embodiment of the present technology, it is possible to extend the optical path even with a mechanism that is further miniaturized by the V-shaped reflection portion 64 and the extension reflection plane 62. The V-shaped reflection portion 64 can include a recess and can be easily molded. The extension reflection planes can be obtained by a similar manufacturing method to that of the reflection plane 10 described above.

It is further preferable that the optical path extension mechanism 60 is configured to propagate light from the emission plane 66 to the propagation plane of the first optical path converting unit 5.

The emission plane 66 of the optical path extension mechanism 60, preferably, includes a collimated light forming mechanism, which allows collimated light to be propagated to the first optical path converting unit 5.

The operation in a case where the optical path extension mechanism in the eighth embodiment of the present technology is used will be described. Light enters the optical path extension mechanism 60 from the optical fiber 16a through the incident plane 65. The incident light is reflected by the extension reflection planes 61, 62, and 63 in the order mentioned, thereby extending the optical path. The light extended by passing from the extension reflection plane 63 through the emission plane 66 enters the first optical path converting unit 5. Then, with the reflection plane 10 and the emission plane 11, the light is emitted in the opposite direction of the light propagation. This light is received by an incident plane 11 of the other optical connector, and the received light is reflected by a reflection plane 10 and sent to an optical fiber 16.

Then, by the optical path extension mechanism in the eighth embodiment of the present technology, the range of the optical axis tolerance can be further expanded without increasing the length of the exterior of the optical connector.

As described above, an optical connector of the present technology has high long-term reliability, is applicable to a wide range of use environments, and can be used in various usages. The present technology has an advantage of being less affected by an external impact while leveraging the advantage of the collimated coupling system.

Furthermore, with the present technology, it is possible to implement a countermeasure against laser hazards when the optical connectors are not connected to each other, to improve durability when inserting and removing, to reduce the effects of an impact or foreign matters, and to achieve all of these at the same time. Furthermore, the present technology can also provide a small-sized optical connector having a practical structure. An optical connector of the present technology can have a wider range of optical axis tolerance than conventional optical connectors. Note that the effects described herein are not necessarily limiting, and it suffices to achieve any one of the effects described in the present disclosure.

<Example of Use of Present Technology>

An optical connector of the present technology can be used in optical transmission mechanisms such as an optical cable and can be used by being connected to an electronic device that performs optical transmission. An optical connector jack is included in an electronic device as a connection unit for an optical connector, and an optical connector of the present technology can be connected to the optical connector jack. Moreover, a similar mechanism to that of the present technology may be adopted in an optical connector jack of an electronic device. Furthermore, although the description has been given using an optical fiber in the present technology, another optical transmission medium such as an optical waveguide may be used instead of an optical fiber in a case where an effect of the present technology is achieved.

The present technology can be applied to various electronic devices that use an optical connector.

Examples of those including an electronic device that use an optical connector include Internet mechanisms, optical communications, automobiles, and electric vehicles; however, the present technology is not limited thereto.

Note that the present technology can also adopt the following configurations.

[1]

An optical connector, including:
a first optical path converting unit having one or more reflection planes, the first optical path converting unit configured to emit light in an opposite direction of light propagation.

[2]

The optical connector according to item [1], in which the first optical path converting unit is configured to emit light toward a second optical path converting unit that is present when the optical connector is connected with another optical connector.

[3]

The optical connector according to item [2], in which the first optical path converting unit and the second optical path converting unit are configured to form a Z-shaped optical path.

[4]

The optical connector according to any one of items [1] to [3], further including:
- a housing;
- a support that supports the first optical path converting unit; and
- a light shield,
- in which the support and the light shield are accommodated in the housing.

[5]

The optical connector according to any one of items [1] to [4],
- in which the first optical path converting unit is an optical path conversion block including a transparent member, and
- the optical path conversion block has a reflection plane and an emission plane that emit light in the opposite direction of the light propagation.

[6]

The optical connector according to any one of items [1] to [5],
- in which the first optical path converting unit has a protrusion protruding with respect to the emission plane on an emission end side and in a lateral direction of the first optical path converting unit.

[7]

The optical connector according to any one of items [1] to [6],
- in which the first optical path converting unit is provided inside a support and has at least one or more reflection planes that reflect light in the opposite direction of the light propagation inside the support.

[8]

The optical connector according to item [7], in which the support supports an optical fiber or a collimating lens connected with the optical fiber.

[9]

The optical connector according to any one of items [1] to [8], in which the first optical path converting unit includes a collimated light forming mechanism on an optical path.

[10]

The optical connector according to any one of items [1] to [9], in which a partition unit that partitions the first optical path converting unit from an outside is further included in a lateral direction on an emission end side of the first optical path converting unit.

[11]

The optical connector according to any one of items [1] to [10], in which the first optical path converting unit further includes a protection unit on an emission end side of the first optical path converting unit.

[12]

The optical connector according to any one of items [1] to [11],
- in which the optical connector has a plurality of the first optical path converting units, and
- the plurality of first optical path converting units is arranged so as to be symmetrical with respect to the light propagation.

[13]

The optical connector according to any one of items [1] to [12], in which an emission plane of the first optical path converting unit is inclined so as not to be perpendicular to an optical path from the reflection plane.

[14]

The optical connector according to any one of items [1] to [13], further including an optical axis tolerance adjusting mechanism.

[15]

The optical connector according to item [14],
- in which the optical axis tolerance adjusting mechanism includes an optical path extension mechanism having a plurality of reflection planes, and
- the optical path extension mechanism is disposed preceding to a point where light arrives at an emission plane of the first optical path converting unit.

REFERENCE SIGNS LIST

1 Optical connector (first optical connector, second optical connector)
4 Light propagation direction
5 Optical path converting unit (first optical path converting unit, second optical path converting unit)
6 Optical path
7 Return light
9a Emission position
9b Spot position
10, 10a, 10b Reflection plane
11 Emission plane (incident plane)
12 Protrusion
13 Housing
14 Support
15 Light shield
16, 16a, 16b Optical fiber
17 Collimating lens
18 Light receiving element
19 Propagation plane
21 Optical fiber support
30 Partition unit
31 Partition
32 Energizing unit
40 Protection unit
51 Light diffusing lens
60 Optical path extension mechanism
61, 62, 63 Extension reflection plane
64 V-shaped reflection portion
65 Incident plane
66 Emission plane
67 Extension support
M Microchip

The invention claimed is:

1. An optical connector, comprising:
a first optical path converting unit having one or more reflection planes, the first optical path converting unit configured to emit or reflect light in an opposite direction of light propagation; and
an optical axis tolerance adjusting mechanism comprising an optical path extension mechanism having a plurality of reflection planes, wherein the optical path extension mechanism is disposed preceding to a point where light arrives at an emission plane of the first optical path converting unit.

2. The optical connector according to claim 1, wherein the first optical path converting unit is configured to emit or reflect light toward a second optical path converting unit that is present when the optical connector is connected with another optical connector.

3. The optical connector according to claim 2, wherein the first optical path converting unit and the second optical path converting unit are configured to form a Z-shaped optical path.

4. The optical connector according to claim 1, further comprising:
a housing;
a support that supports the first optical path converting unit; and
a light shield,
wherein the support and the light shield are accommodated in the housing.

5. The optical connector according to claim 1,
wherein the first optical path converting unit is an optical path conversion block comprising a transparent member, and
the optical path conversion block has a reflection plane and an emission plane that emit or reflect light in the opposite direction of the light propagation.

6. The optical connector according to claim 1, wherein the first optical path converting unit has a protrusion protruding with respect to the emission plane on an emission end side and in a lateral direction of the first optical path converting unit.

7. The optical connector according to claim 1,
wherein the first optical path converting unit is provided inside a support and has, inside the support, at least one or more reflection planes that reflect light in the opposite direction of the light propagation.

8. The optical connector according to claim 7, wherein the support supports an optical fiber or a collimating lens connected with the optical fiber.

9. The optical connector according to claim 1, wherein the first optical path converting unit comprises a collimated light forming mechanism on an optical path.

10. The optical connector according to claim 1, wherein a partition unit that partitions the first optical path converting unit from an outside is further comprised in a lateral direction on an emission end side of the first optical path converting unit.

11. The optical connector according to claim 1, wherein the first optical path converting unit further comprises a protection unit on an emission end side of the first optical path converting unit.

12. The optical connector according to claim 1,
wherein the optical connector has a plurality of the first optical path converting units, and
the plurality of first optical path converting units is arranged so as to be symmetrical with respect to the light propagation.

13. The optical connector according to claim 1, wherein an emission plane of the first optical path converting unit is inclined so as not to be perpendicular to an optical path from the reflection plane.

* * * * *